(12) United States Patent
Eschenburg et al.

(10) Patent No.: US 10,801,556 B2
(45) Date of Patent: Oct. 13, 2020

(54) AXLE ASSEMBLY HAVING A WHEEL END DISCONNECT AND METHOD OF CONTROL

(71) Applicant: ArvinMeritor Technology, LLC, Troy, MI (US)

(72) Inventors: Dale Eschenburg, Rochester Hills, MI (US); Brian D. Hayes, Newark, OH (US); Robert J. Martin, Harrison Township, MI (US); Christopher Keeney, Troy, MI (US); Pedro Garcia, Clarkston, MI (US); David G. Gonska, Beverly Hills, MI (US); Jack R. McKenzie, Clarkston, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 192 days.

(21) Appl. No.: 15/964,780

(22) Filed: Apr. 27, 2018

(65) Prior Publication Data
US 2019/0331173 A1  Oct. 31, 2019

(51) Int. Cl.
| F16D 21/00 | (2006.01) |
| F16D 21/08 | (2006.01) |
| B60K 23/08 | (2006.01) |
| F16D 11/14 | (2006.01) |
| F16D 13/52 | (2006.01) |

(52) U.S. Cl.
CPC ............. *F16D 21/08* (2013.01); *B60K 23/08* (2013.01); *F16D 11/14* (2013.01); *F16D 13/52* (2013.01)

(58) Field of Classification Search
CPC .......... F16D 21/00; F16D 21/08; F16D 11/14; F16D 13/52; B60K 23/08
See application file for complete search history.

(56) References Cited

U.S. PATENT DOCUMENTS

| 2,312,263 A | 2/1943 | Ormsby |
| 3,199,375 A | 8/1965 | Rosen et al. |
| 4,263,824 A | 4/1981 | Mueller |
| 4,914,979 A | 4/1990 | Balmforth |
| 5,092,188 A | 3/1992 | Fujikawa et al. |
| 5,989,143 A | 11/1999 | Bell et al. |
| 8,382,633 B2 | 2/2013 | Cooper et al. |
| 8,398,520 B1 | 3/2013 | Bassi et al. |

(Continued)

FOREIGN PATENT DOCUMENTS

| DE | 1430473 A1 | 10/1968 |
| DE | 19805881 C1 | 6/1999 |

(Continued)

OTHER PUBLICATIONS

Dale Eschenburg, et al., United States Patent and Trademark Office, U.S. Appl. No. 16/059,226, filed Aug. 9, 2018.

(Continued)

*Primary Examiner* — Huan Le
(74) *Attorney, Agent, or Firm* — Brooks Kushman PC

(57) ABSTRACT

An axle assembly having a wheel end disconnect and a method of control. The axle assembly may include a friction clutch and a locking clutch that may be received in a hub assembly. The friction clutch may be moveable between an engaged position and a disengaged position. The locking clutch may be moveable between a locked position and an unlocked position and may actuate the friction clutch to the disengaged position.

20 Claims, 14 Drawing Sheets

(56) References Cited

U.S. PATENT DOCUMENTS

| | | |
|---|---|---|
| 8,523,738 B2 | 9/2013 | Morscheck et al. |
| 8,562,479 B2 | 10/2013 | Hamperl et al. |
| 8,651,994 B2 | 2/2014 | Bassi et al. |
| 8,845,473 B2 | 9/2014 | Nett et al. |
| 8,851,212 B2 | 10/2014 | Kahl |
| 8,911,321 B2 | 12/2014 | Ziech et al. |
| 9,020,715 B2 | 4/2015 | Nellums et al. |
| 9,102,232 B2 | 8/2015 | Ziech et al. |
| 9,109,635 B2 | 8/2015 | Boothby et al. |
| 9,121,455 B2 | 9/2015 | Cooper |
| 9,284,995 B2 | 3/2016 | Lawson et al. |
| 9,333,857 B2 | 5/2016 | Morscheck et al. |
| 9,428,050 B2 | 8/2016 | Ziech et al. |
| 9,457,655 B2 | 10/2016 | Ziech et al. |
| 9,457,656 B2 | 10/2016 | Ziech et al. |
| 9,457,657 B2 | 10/2016 | Ziech et al. |
| 2002/0187870 A1 | 12/2002 | Staheli et al. |
| 2006/0046888 A1* | 3/2006 | Puiu ............... B60K 17/16 475/151 |
| 2011/0218715 A1 | 9/2011 | Duraiswamy et al. |
| 2012/0202640 A1 | 8/2012 | Morimoto |
| 2013/0085031 A1 | 4/2013 | Bassi et al. |
| 2014/0141923 A1 | 5/2014 | Forsyth |
| 2015/0126320 A1 | 5/2015 | Genise et al. |
| 2015/0247562 A1* | 9/2015 | Valente ............ B60K 23/0808 475/223 |
| 2016/0280066 A1 | 9/2016 | Tavvala et al. |
| 2016/0363205 A1 | 12/2016 | Tiziani et al. |
| 2017/0144540 A1* | 5/2017 | Kincaid ............... B60K 17/348 |
| 2018/0147939 A1 | 5/2018 | Sharma et al. |

FOREIGN PATENT DOCUMENTS

| | | |
|---|---|---|
| DE | 102008015200 A1 | 9/2009 |
| DE | 102008002844 A1 | 11/2009 |
| EP | 3163126 A1 | 5/2017 |
| EP | 3473477 A1 | 4/2019 |
| JP | H0999754 A | 4/1997 |
| WO | 2006004489 A1 | 1/2006 |
| WO | 2011097244 A2 | 8/2011 |
| WO | 2016205480 A1 | 12/2016 |

OTHER PUBLICATIONS

United States Patent and Trademark Office, U.S. Appl. No. 15/667,677, filed Aug. 3, 2017.

Dale Eschenburg, et al, U.S. Appl. No. 16/190,818, filed Nov. 14, 2018.

European Patent Office, Extended European Search Report for corresponding European Application No. 19167158.5—1012, dated Sep. 27, 2019.

United States Patent and Trademark Office, U.S. Appl. No. 16/059,395, filed Aug. 9, 2018.

* cited by examiner

AXLE ASSEMBLY HAVING A WHEEL END DISCONNECT AND METHOD OF CONTROL

TECHNICAL FIELD

This disclosure relates to an axle assembly having a wheel end disconnect and a method of control.

BACKGROUND

An axle assembly having a wheel end disconnect unit is disclosed in U.S. Pat. No. 8,398,520.

SUMMARY

In at least one embodiment, an axle assembly is provided. The axle assembly may include a hub assembly, an axle shaft, a friction clutch, and a locking clutch. The hub assembly may be rotatable about an axis. The axle shaft may be received in the hub assembly and may be rotatable about the axis. The friction clutch may be received in the hub assembly and may be movable between an engaged position and a disengaged position. Torque may be transmitted between the axle shaft and the hub assembly when the friction clutch is in the engaged position. The locking clutch may be received in the hub assembly and may be rotatable about an axis with the axle shaft. The locking clutch may be movable between a locked position and an unlocked position. The locking clutch may transmit torque between the axle shaft and the hub assembly when in the locked position. The locking clutch may not transmit torque to rotate the hub assembly when in the unlocked position.

In at least one embodiment, an axle assembly is provided. The axle assembly may include a hub assembly, a hub assembly, an axle shaft, a friction clutch, and a locking clutch. The hub assembly may be rotatable about an axis. The axle shaft may be received in the hub assembly and may be rotatable about the axis. The friction clutch may be configured to transmit torque between the axle shaft and the hub assembly. The friction clutch may be moveable between an engaged position and a disengaged position. The locking clutch may be configured to transmit torque between the axle shaft and the hub assembly and may be moveable between a locked position and an unlocked position in which the locking clutch does not transmit torque to rotate the hub assembly. The locking clutch may actuate the friction clutch to the disengaged position when the locking clutch moves to the unlocked position.

In at least one embodiment, a method of controlling an axle assembly is provided. The method may include disconnecting an axle shaft from a hub assembly that is adapted to support a wheel. A locking clutch may be actuated from a locked position in which the locking clutch transmits torque to the hub assembly to an intermediate position in which the locking clutch does not transmit torque between the axle shaft and the hub assembly. A friction clutch may be engaged and may transmit torque between the axle shaft and the hub assembly when the locking clutch is in the intermediate position. The locking clutch may be actuated from the intermediate position to an unlocked position in which the locking clutch actuates the friction clutch from an engaged position to a disengaged position. Torque may be transmitted between the axle shaft and the hub assembly via the friction clutch when the friction clutch is in the engaged position. The friction clutch may not transmit sufficient torque from the axle shaft to rotate the hub assembly when the friction clutch is in the disengaged position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
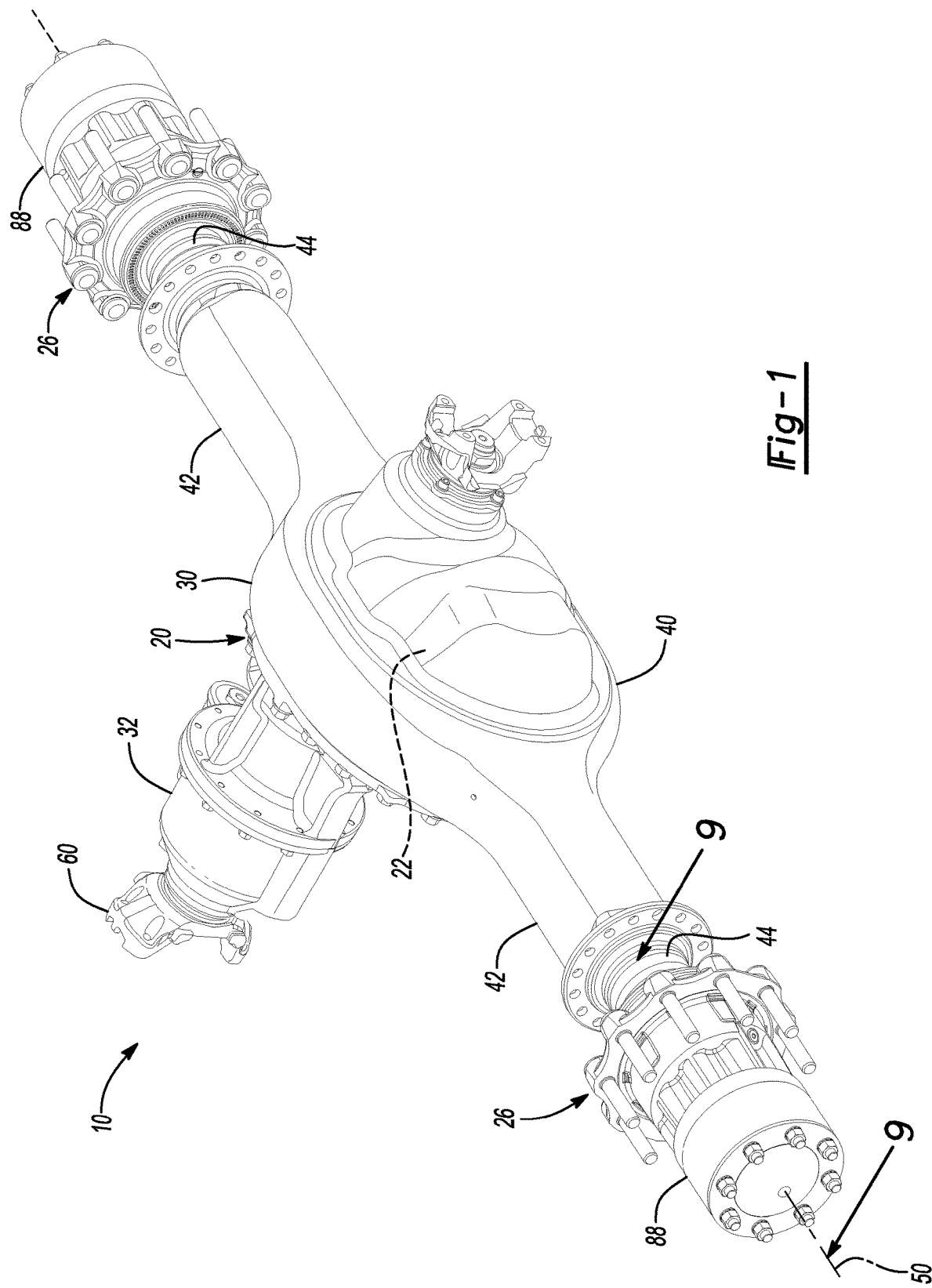
FIG. 1 is a perspective view of an axle assembly having a wheel end disconnect.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may be part of a vehicle drivetrain that may provide torque to one or more traction wheel assemblies that may include a tire mounted on a wheel. One or more axle assemblies may be provided with the vehicle. For example, the axle assembly 10 may be part of a tandem axle configuration or multi-axle configuration that may include a plurality of axle assemblies that may be connected in series. As is best shown with reference to FIGS. 1 and 2, the axle assembly 10 may include a housing assembly 20, a differential assembly 22, at least one axle shaft 24, and a wheel end assembly 26.

Referring to FIG. 1, the housing assembly 20 may receive various components of the axle assembly 10. In addition, the housing assembly 20 may facilitate mounting of the axle assembly 10 to the vehicle. The housing assembly 20 may include an axle housing 30 and a differential carrier 32.

Figure 2:
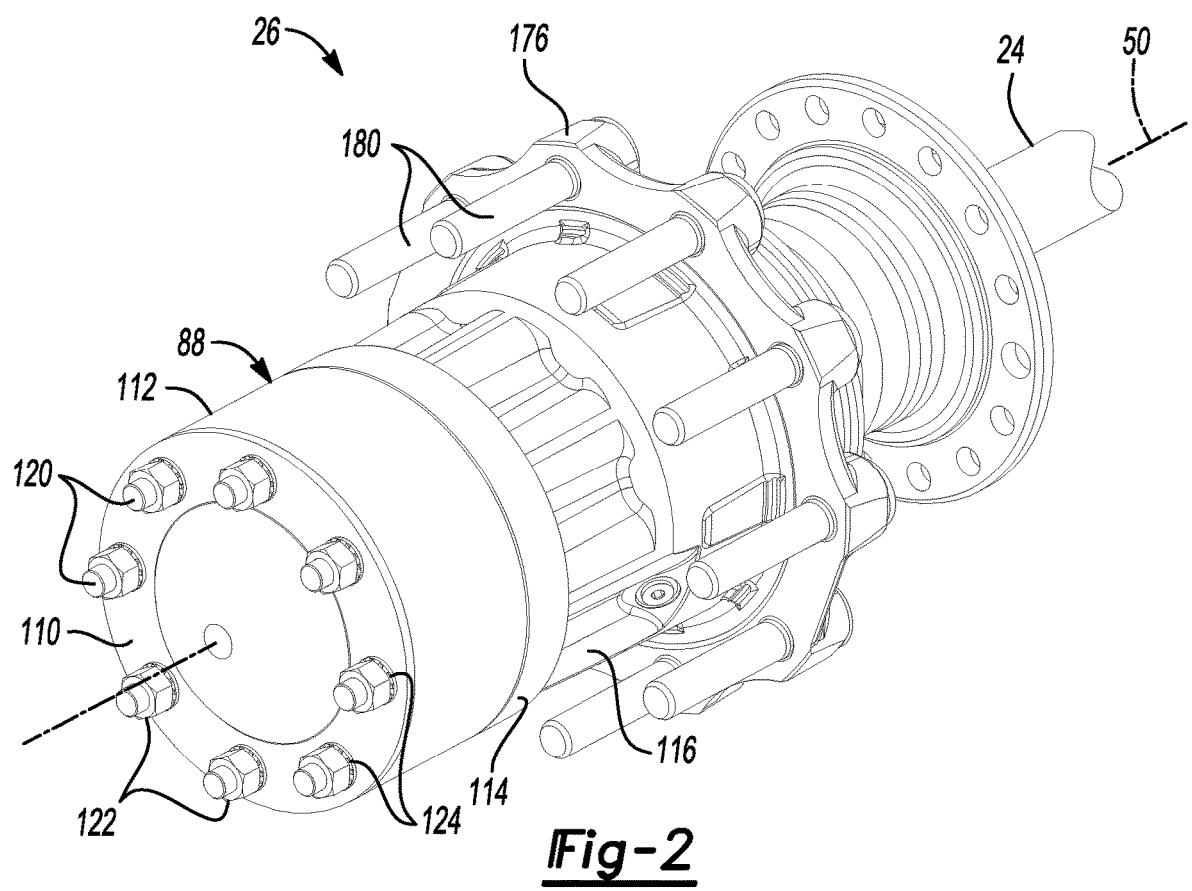
FIG. 2 is a perspective view of a portion of FIG. 1 having the wheel end disconnect.
Figure 9:
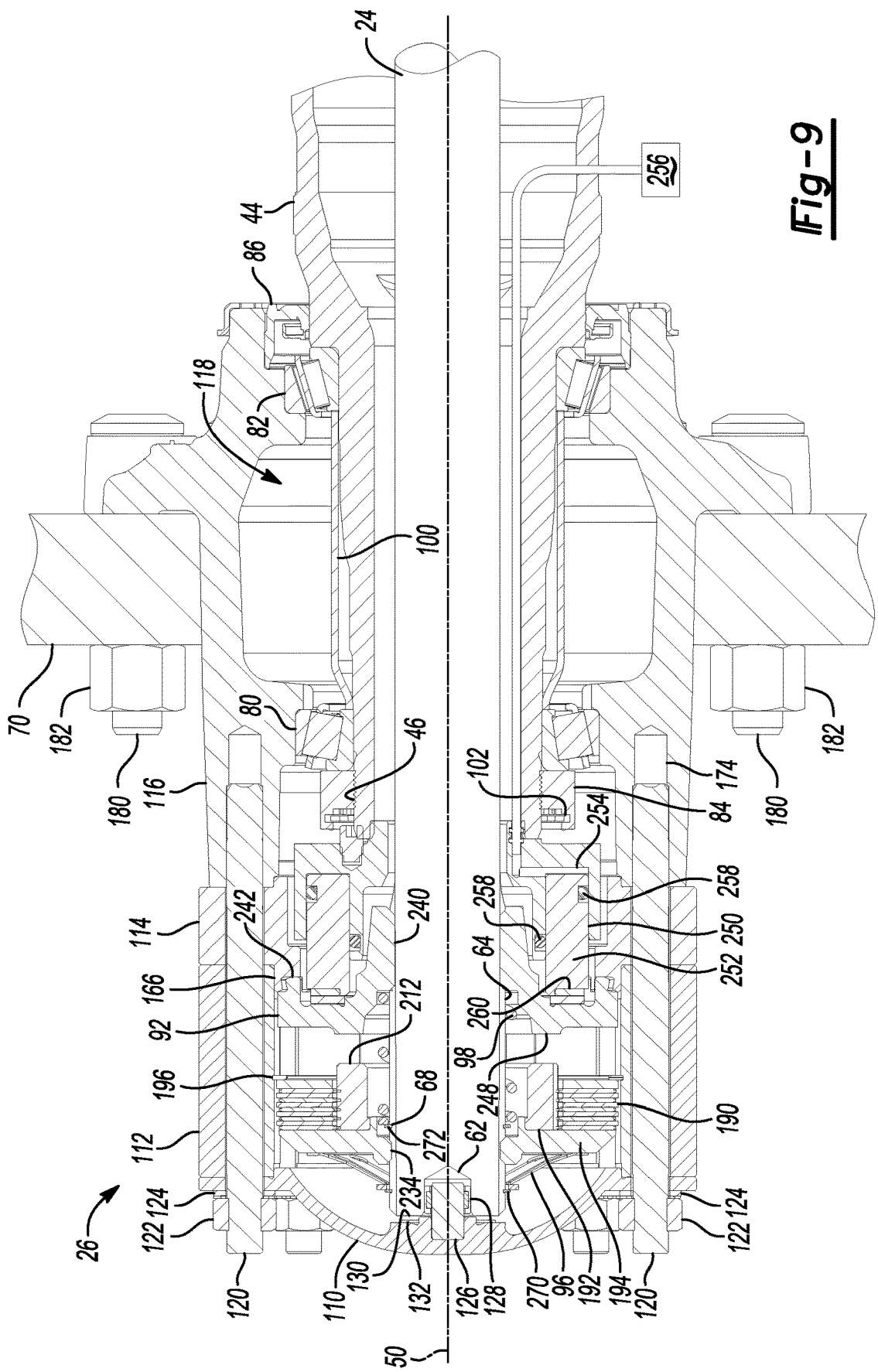
FIG. 9 is a section view along section line 9-9 showing a locking clutch in a locked position and a friction clutch in an engaged position.

The axle housing 30 may receive and support the axle shafts 24, which are best shown in FIGS. 2 and 9. In at least one embodiment, the axle housing 30 may include a center portion 40 and at least one arm portion 42.

The center portion 40 may be disposed proximate the center of the axle housing 30. The center portion 40 may define a cavity that may receive the differential assembly 22. A lower region of the center portion 40 may at least partially define a sump portion that may contain lubricant. Lubricant in the sump portion may be splashed by rotating components, such as a ring gear of the differential assembly 22. Splashed lubricant may flow down the sides of the center portion 40 or may flow over internal components of the axle assembly 10 and gather in the sump portion.

The center portion 40 may include a carrier mounting surface. The carrier mounting surface may face toward and may engage the differential carrier 32. The carrier mounting surface may facilitate mounting of the differential carrier 32 to the axle housing 30. For example, the carrier mounting surface may have a set of holes that may be aligned with corresponding holes on the differential carrier 32. Each hole may receive a fastener, such as a bolt, that may couple the differential carrier 32 to the axle housing 30.

One or more arm portions 42 may extend from the center portion 40. For example, two arm portions 42 may extend in opposite directions from the center portion 40 and away from the differential assembly 22. The arm portions 42 may have substantially similar configurations. For example, the arm portions 42 may each have a hollow configuration or tubular configuration that may extend around the corresponding axle shaft 24 and may help separate or isolate the axle shaft 24 from the surrounding environment. An arm portion 42 or a portion thereof may be integrally formed with the center portion 40. Alternatively, an arm portion 42 may be separate from the center portion 40. In such a configuration, each arm portion 42 may be attached to the center portion 40 in any suitable manner, such as by welding or with one or more fasteners. Each arm portion 42 may define an arm cavity that may receive a corresponding axle shaft 24. In addition, each arm portion 42 may include a spindle 44.

Figure 5:
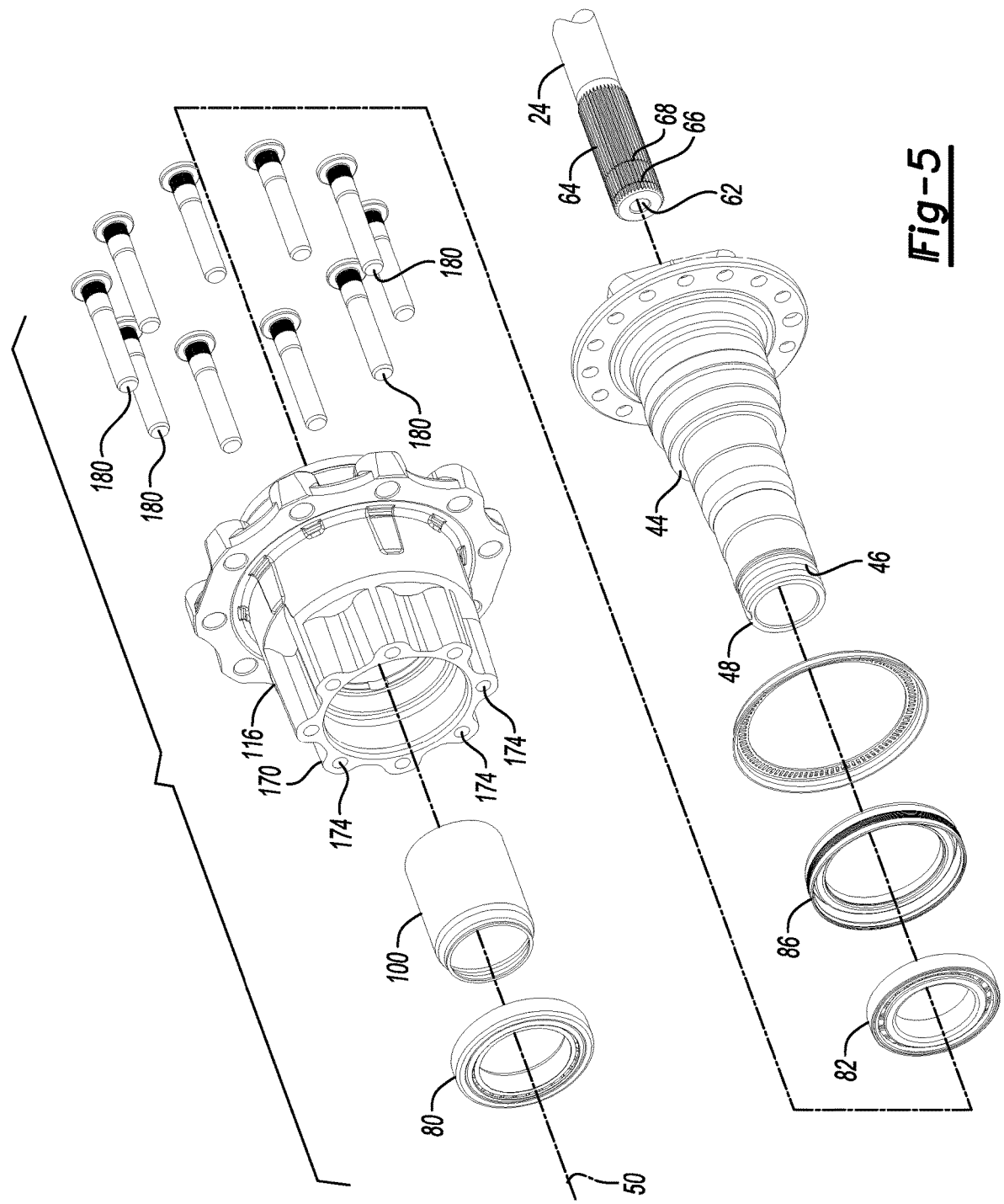

Referring to FIGS. 1 and 5, the spindle 44 may be disposed at an end of each arm portion 42 that may be disposed opposite the center portion 40. The spindle 44 may be integrally formed with the arm portion 42 or may be provided as a separate component that is attached to an arm portion 42. The spindle 44 may extend around or may be centered about an axis 50 and may define a hole through which the axle shaft 24 may extend. In addition, the spindle 44 may rotatably support a hub of the wheel end assembly 26 as will be discussed in more detail below. In at least one configuration, the spindle may include a threaded portion 46 that may extend around an exterior surface of the spindle 44. The threaded portion 46 may be disposed proximate a spindle end surface 48 that may be disposed at a distal end of the spindle 44.

Referring to FIG. 1, the differential carrier 32, which may also be called a carrier housing, may be mounted on the center portion 40 of the axle housing 30. The differential carrier 32 may rotatably support the differential assembly 22.

The differential assembly 22 may be disposed in the center portion 40 of the housing assembly 20. The differential assembly 22 may transmit torque to the vehicle traction wheel assemblies and permit the traction wheel assemblies to rotate at different velocities. An abbreviated discussion of the operation of the differential assembly 22 follows with reference to FIG. 1.

An input yoke 60 may be coupled to a vehicle drivetrain component, such as a drive shaft, that may be operatively connected to an output of a vehicle transmission or transfer case, which in turn may receive torque from a vehicle power source, such as an engine or motor. Alternatively, the input yoke 60 may be operatively connected to an output of another axle assembly. The input yoke 60 may be operatively connected to a drive pinion that may be disposed in the housing assembly 20. The drive pinion may provide torque to a ring gear of the differential assembly 22. The differential assembly 22 may be operatively connected to the axle shafts 24 and may permit the axle shafts 24 to rotate at different rotational speeds in a manner known by those skilled in the art. As such, the differential assembly 22 may receive torque via the ring gear and provide torque to the axle shafts 24.

Referring to FIGS. 2, 5 and 9, the axle shafts 24 may transmit torque from the differential assembly 22 to corresponding traction wheel assemblies. For example, two axle shafts 24 may be provided such that each axle shaft 24 extends through a different arm portion 42 of axle housing 30. The axle shafts 24 may extend along and may be rotatable about the axis 50 by the differential assembly 22. Each axle shaft 24 may have a first end and a second end. The first end may be operatively connected to the differential assembly 22. The second end may be disposed opposite the first end and may be operatively connected to a corresponding wheel end assembly 26. In at least one configuration, the second end may include an axle recess 62 an axle spline 64, a first groove 66, and a second groove 68 as is best shown in FIG. 5.

The axle recess 62 may be disposed along the axis 50. The axle recess 62 may be configured as a blind hole that may extend from an end surface of the axle shaft 24 toward the first end and the differential assembly 22.

The axle spline 64 may be disposed opposite the axle recess 62. The axle spline 64 may include a plurality of teeth that may be arranged around an exterior surface or outside circumference of the axle shaft 24. The teeth may be disposed substantially parallel to the axis 50.

The first groove 66 and the second groove 68 may be provided in the axle spline 64. For example, the first groove 66 and the second groove 68 may each have an annular configuration in which the first groove 66 and the second groove 68 may extend continuously around the axis 50. In addition, the first groove 66 and the second groove 68 may extend in a radial direction toward the axis 50 such that the first groove 66 and the second groove 68 may extend at least partially through the teeth of the axle spline 64. The first groove 66 may be disposed substantially parallel to the second groove 68 and may be spaced apart from the second groove 68. For example, the first groove 66 may be axially positioned closer to the end surface of the axle shaft 24 than the second groove 68. In at least one configuration, the first groove 66 may extend around the axle recess 62 while the second groove 68 may not extend around the axle recess 62.

Figure 3:
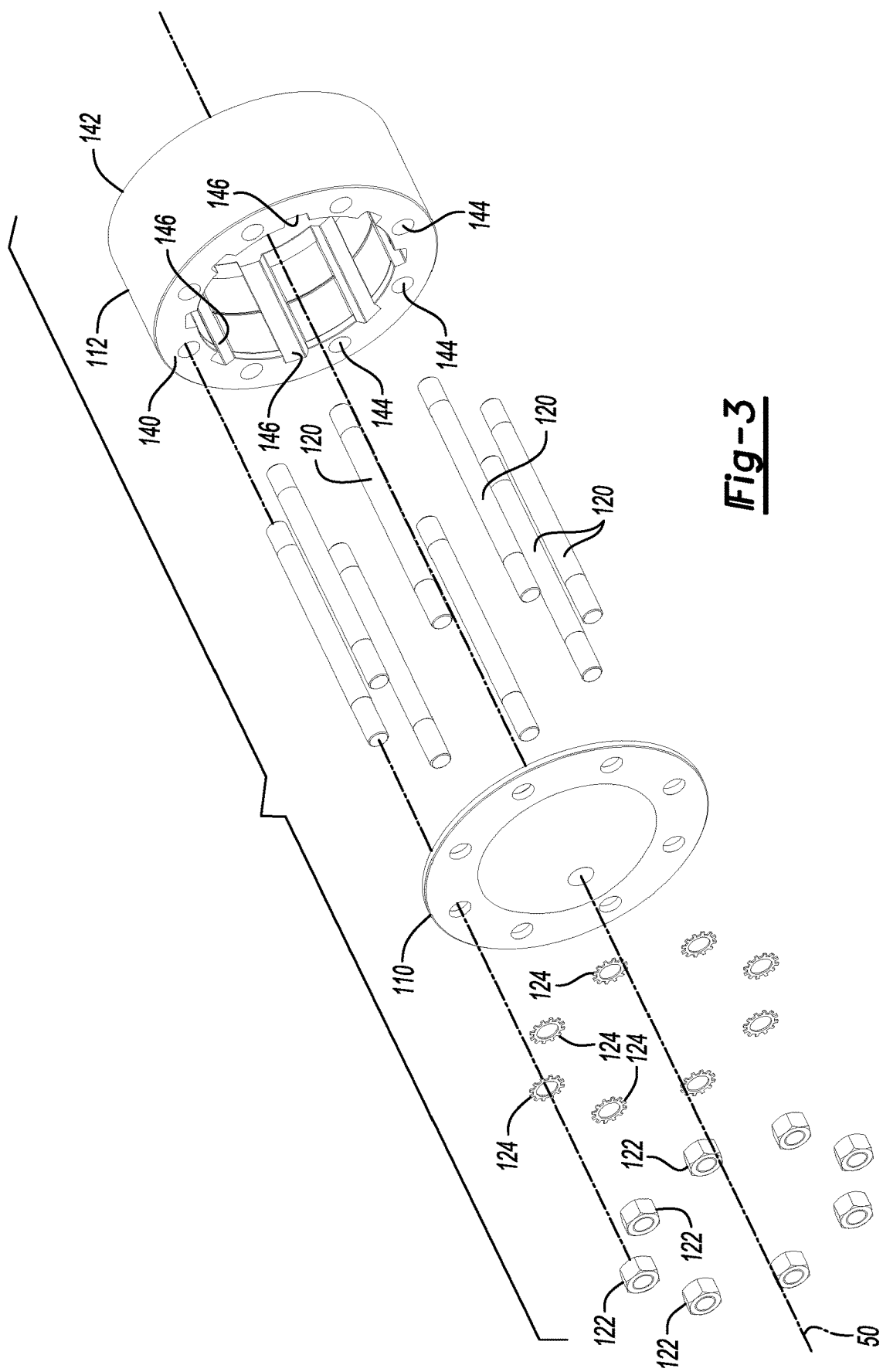
FIGS. 3-5 comprise an exploded view of FIG. 2.
Figure 4:
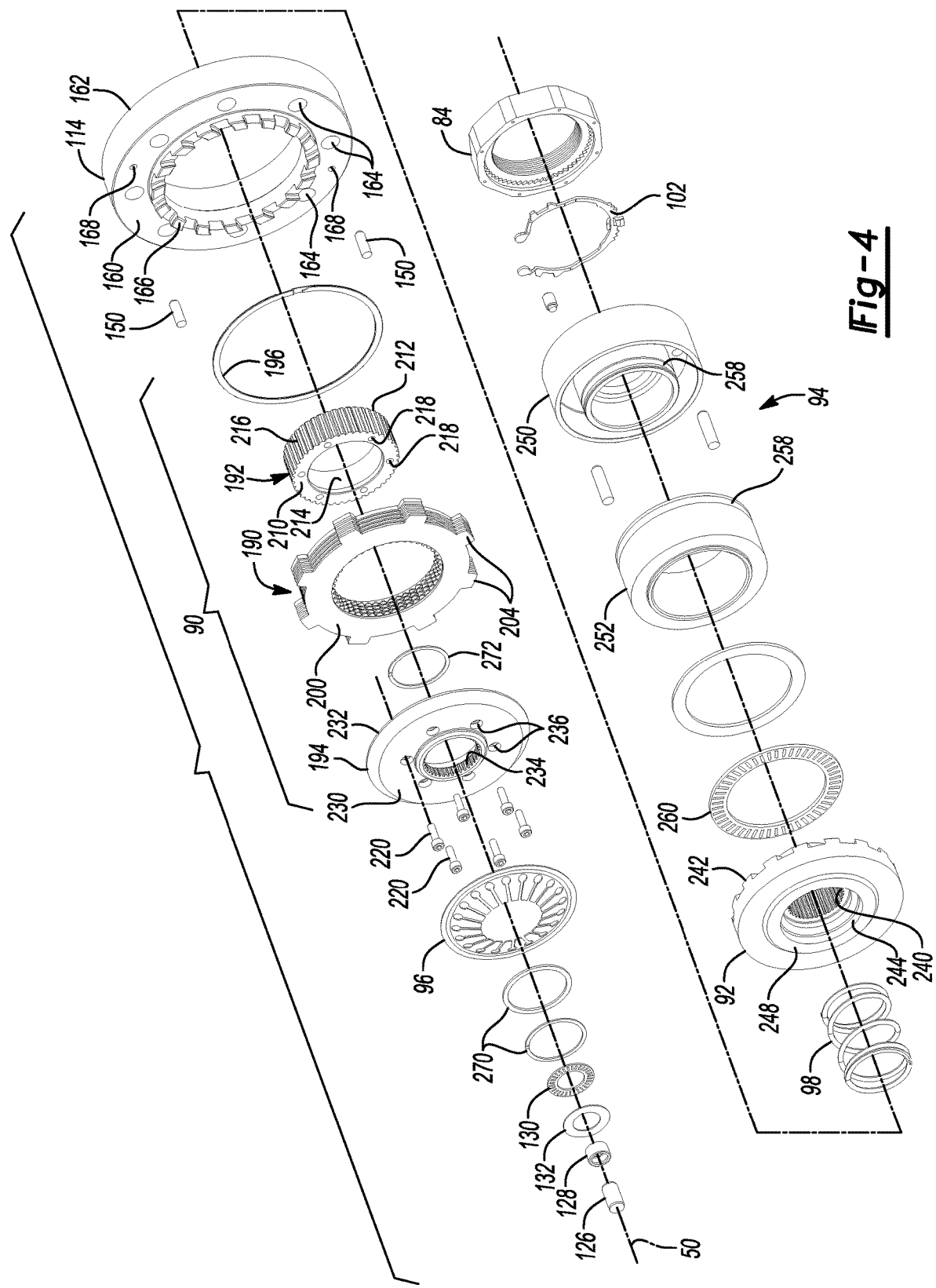

Referring to FIGS. 1 and 2, wheel end assemblies 26 may be mounted at opposing ends of the housing assembly 20. The wheel end assembly 26 may facilitate mounting and rotation of a vehicle wheel 70, which is best shown in FIG. 9. In addition, the wheel end assembly 26 may be selectively connectable to and disconnectable from a corresponding axle shaft 24 as will be discussed in more detail below. In at least one configuration such as is shown in FIGS. 3-5, the wheel end assembly 26 may include a first wheel bearing 80, a second wheel bearing 82, a preload nut 84, a seal assembly 86, a hub assembly 88, a friction clutch 90, a locking clutch 92, a locking clutch actuator 94, a first biasing member 96, and a second biasing member 98.

The components associated with selectively connecting and disconnecting the wheel end assembly 26 from a corresponding axle shaft 24 may be referred to as a wheel end disconnect. For instance, components such as the friction clutch 90, locking clutch 92, locking clutch actuator 94, first biasing member 96, and second biasing member 98 may allow torque to be transmitted between the axle shaft 24 and its corresponding hub assembly 88 that is sufficient to rotate the hub assembly 88 when the wheel end disconnect is connected or in a connected condition and may not allow torque to be transmitted between the axle shaft 24 and its corresponding hub assembly 88 that is sufficient to rotate the hub assembly 88 when disconnected or in a disconnected condition.

Figure 8:
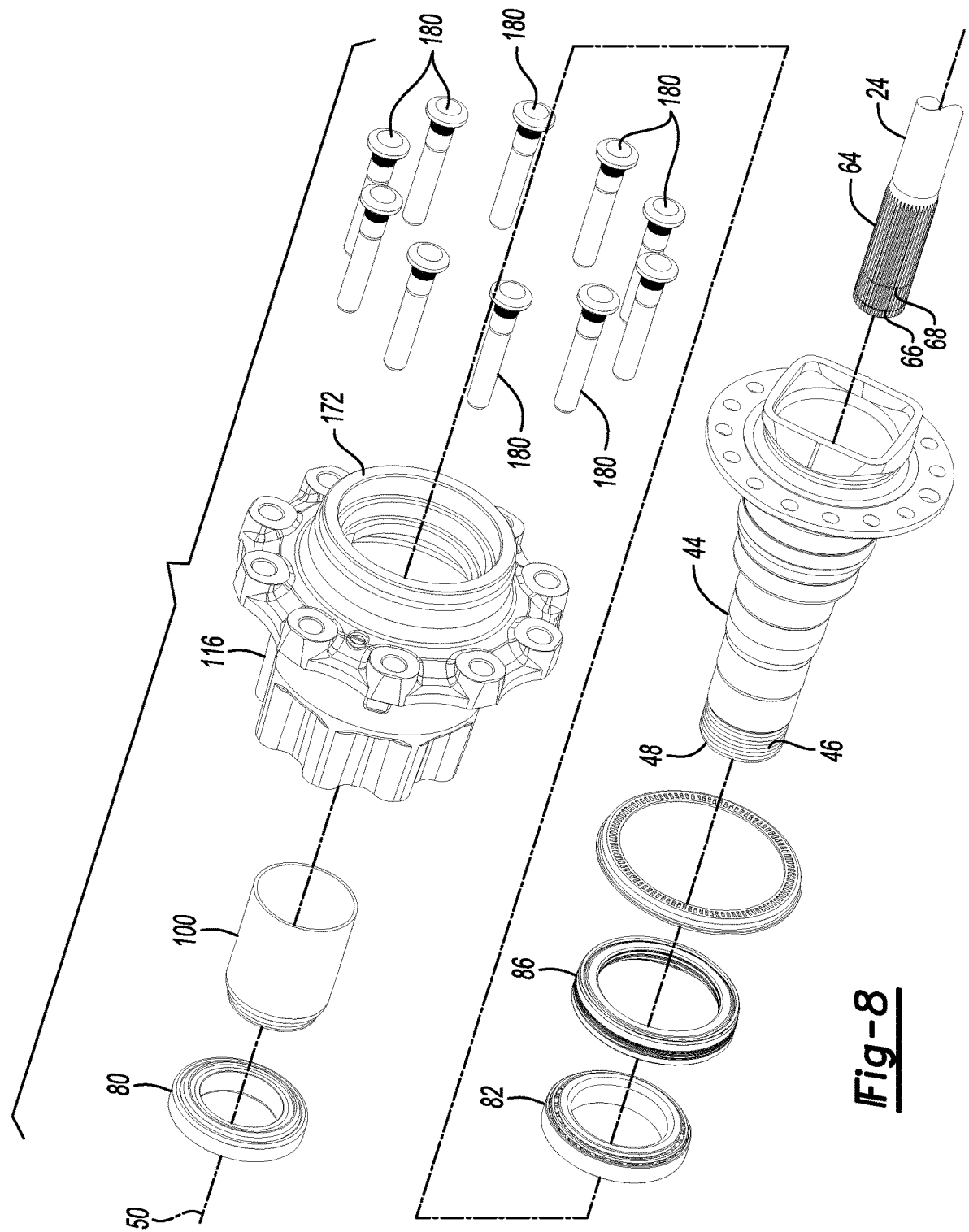

Referring to FIGS. 5, 8 and 9, the first wheel bearing 80 may be disposed on the spindle 44 and may rotatably support the hub assembly 88. For example, the first wheel bearing 80 may be disposed on and may extend around the external surface of the spindle 44 and may be received inside the hub assembly 88. The first wheel bearing 80 may be positioned closer to the spindle end surface 48 than the second wheel bearing 82. The first wheel bearing 80 may have any suitable configuration. For instance, the first wheel bearing 80 may include a plurality of rolling elements, such as balls or rollers, that may be disposed between an inner race and an outer race. The inner race may be disposed on and may extend around an external surface or outside circumferential surface of the spindle 44. The outer race may be disposed on the hub assembly 88 and may extend around the inner race.

The second wheel bearing 82 may also be disposed on the spindle 44 and may rotatably support the hub assembly 88. For example, the second wheel bearing 82 may be disposed on and may extend around the external surface of the spindle 44 and may be received inside the hub assembly 88. The second wheel bearing 82 may be spaced apart from the first wheel bearing 80 and may be positioned closer to the differential assembly 22 than the first wheel bearing 80. The second wheel bearing 82 may have any suitable configuration. For instance, the second wheel bearing 82 may include a plurality of rolling elements, such as balls or rollers, that may be disposed between an inner race and an outer race.

Figure 7:
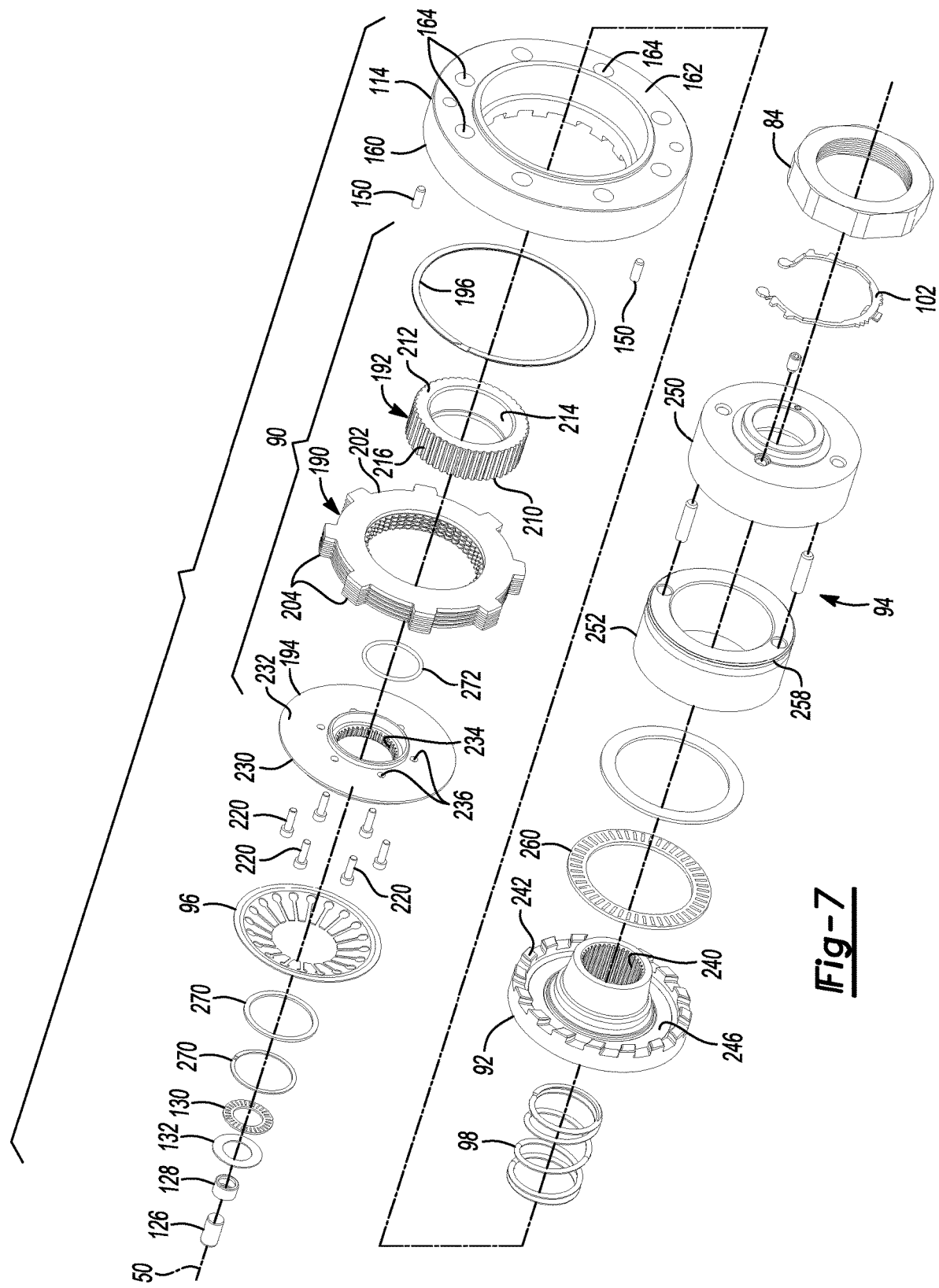

Referring to FIGS. 4, 7 and 9, the preload nut 84 may help secure the first wheel bearing 80. More specifically, the preload nut 84 may inhibit or limit axial movement of the first wheel bearing 80 along the spindle 44 in a direction that extends toward the spindle end surface 48. For example, the preload nut 84 may receive and may mate with corresponding threads of the threaded portion 46 of the spindle 44. The preload nut 84 may engage the inner race of the first wheel bearing 80 and may be tightened to exert a preload force on the first wheel bearing 80 or the first wheel bearing 80 and the second wheel bearing 82. For instance, a spacer 100, which is shown in FIGS. 5, 8 and 9, may extend from the inner race of the first wheel bearing 80 to the inner race of the second wheel bearing 82. As such, the spacer 100 may keep the inner races at a substantially constant axial distance from each other and facilitate the transmission of preload force. The preload nut 84 may be secured with one or more fasteners 102, such as a snap ring, screw, bolt or combinations thereof, to inhibit the preload nut 84 from rotating or loosening. A key may be provided on the fastener 102 that may be received in a corresponding key slot in the spindle 44 to inhibit rotation of the fastener 102.

Referring to FIGS. 5, 8 and 9, the seal assembly 86 may be disposed between the hub assembly 88 and the spindle 44. For example, the seal assembly 86 may extend continuously around the axis 50 and the spindle 44 and may extend from the spindle 44 to the hub assembly 88. The seal assembly 86 may help inhibit lubricant from exiting the hub assembly 88 and may inhibit contaminants from entering the hub assembly 88.

Referring to FIGS. 2 and 9, the hub assembly 88 may be rotatably disposed on the spindle 44. As such, the hub assembly 88 may be rotatable about the axis 50 with respect to the spindle 44. In at least one configuration, the hub assembly 88 may include a hub cap 110, a first hub portion 112, a second hub portion 114, a third hub portion 116, and a hub cavity 118.

Referring to FIGS. 2, 3, 6 and 9, the hub cap 110 may be disposed at distal end of the hub assembly 88. The hub cap 110 may enclose an end of the hub assembly 88 that may be located near the distal end of the axle shaft 24. The hub cap 110 may be fastened to the first hub portion 112 in any suitable manner, such as with one or more fasteners, such as bolts or mounting studs. In at least one configuration, a set of mounting studs 120 are arranged around the axis 50 and extend through corresponding openings in the hub cap 110. The hub cap 110 may be further secured with nuts 122 and washers 124 that may receive the mounting studs 120.

Referring to FIGS. 4, 7 and 9, the hub cap 110 may be integrally formed with or may receive a guide pin 126. The guide pin 126 may extend along the axis 50 toward the axle shaft 24 and may be received in the axle recess 62 to rotatably support the axle shaft 24. A support bearing 128, such as a roller bearing, may be disposed in the axle recess 62 and may extend around the guide pin 126 to help align and rotatably support the axle shaft 24. A thrust bearing 130 and optionally a washer 132 may be provided between the hub cap 110 and the end of the axle shaft 24 to facilitate rotation of the axle shaft 24 with respect to the hub cap 110.

Referring to FIGS. 2, 3, 6, and 9, the first hub portion 112 may receive the friction clutch 90. In at least one configuration, the first hub portion 112 may extend around the friction clutch 90 and may extend in an axial direction that may extend along the axis 50 from the hub cap 110 to the second hub portion 114. For example, the first hub portion 112 may have a first end surface 140 and a second end surface 142. The first end surface 140 may engage the hub cap 110. The second end surface 142 may be disposed opposite the first end surface 140 and may engage the second hub portion 114. The first hub portion 112 may also include a set of holes 144, at least one slot 146, and one or more alignment pin openings 148.

The set of holes 144 may extend from the first end surface 140 toward the second end surface 142. In the configuration shown, the set of holes 144 are configured as through holes that extend from the first end surface 140 to the second end surface 142 to allow a mounting stud 120 to extend through the first hub portion 112.

One or more slots 146 may extend radially outward from an interior surface of the first hub portion 112. A slot 146 may receive a corresponding tab on a disc that may be provided with the friction clutch 90 as will be discussed in more detail below. For example, a plurality of slots 146 may be provided that may be arranged around the axis 50 and may be spaced apart from each other. Each slot 146 may extend between the first end surface 140 and the second end surface 142 such that the slots 146 may be extend in an axial direction and may extend substantially parallel to the axis 50.

Figure 6:
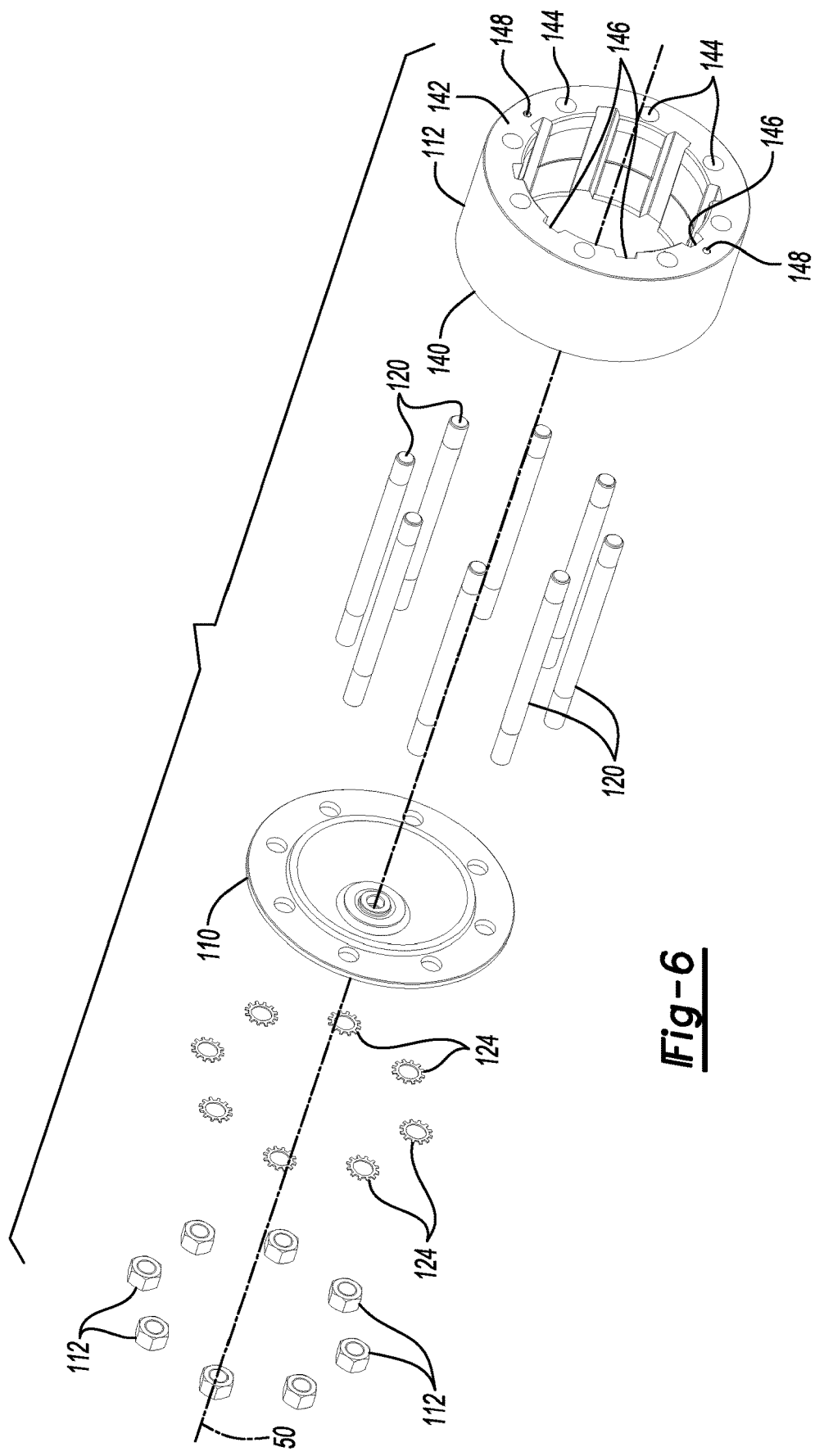
FIGS. 6-8 comprise an exploded view that depicts opposite sides of the components shown in FIGS. 3-5.

Referring to FIG. 6, one or more alignment pin openings 148 may extend from the second end surface 142. An alignment pin opening 148 may receive a corresponding alignment pin 150, which is best shown in FIGS. 4 and 7, that may be received in a corresponding alignment pin opening on the second hub portion 114 to help align the first hub portion 112 and the second hub portion 114.

Referring to FIGS. 2, 4, 7, and 9, the second hub portion 114 may receive at least a portion of the locking clutch 92, the locking clutch actuator 94, or both. The second hub portion 114 may be a separate component from the first hub portion 112; however, it is contemplated that the first hub portion 112 may be integrally formed with the second hub portion 114 in one or more embodiments. In at least one configuration, the second hub portion 114 may extend around the locking clutch 92, the locking clutch actuator 94, or both, and may extend in an axial direction from the first hub portion 112 to the third hub portion 116. For example, the second hub portion 114 may have a first end surface 160 and a second end surface 162. The first end surface 160 may engage the second end surface 142 of the first hub portion 112. The second end surface 162 may be disposed opposite the first end surface 160 and may engage the third hub portion 116. The second hub portion 114 may also include a set of holes 164, a hub gear 166, and one or more alignment pin openings 168.

Referring to FIGS. 4 and 7, the set of holes 164 may extend from the first end surface 160 toward the second end surface 162. In the configuration shown, the set of holes 164 are configured as through holes that extend from the first end surface 160 to the second end surface 162 to allow a mounting stud 120 to extend through the second hub portion 114.

Referring to FIGS. 4, 7, and 9, a hub gear 166 may extend from the second hub portion 114. For example, the hub gear 166 may be configured as a face gear that may include a set of teeth that may extend from the first end surface 160 in a direction that extends away from the second end surface 162. Alternatively, the hub gear 166 may be configured as a spline or set of teeth that may be disposed in the second hub portion 114 and that may extend toward the axis 50. The set of teeth may be arranged around the axis 50 and optionally around the locking clutch actuator 94 and may extend from an inside circumference of the second hub portion 114. As such, the hub gear 166 may be disposed closer to the axis 50 than the holes 164. The teeth of the hub gear 166 may be selectively engaged by the locking clutch 92 as will be discussed in more detail below.

Referring to FIG. 4, one or more alignment pin openings 168 may extend from the first end surface 160. For example, an alignment pin opening 168 that is provided with the first end surface 160 may receive a corresponding alignment pin 150 to help align the first hub portion 112 and the second hub portion 114.

Referring to FIGS. 2, 5, 8, and 9, the third hub portion 116 may receive at least a portion of the spindle 44, the locking clutch actuator 94, or both. The third hub portion 116 may be a separate component from the second hub portion 114; however, it is contemplated that the second hub portion 114 may be integrally formed with the second hub portion 114 in one or more embodiments. In at least one configuration, the third hub portion 116 may extend around and may be spaced apart from the spindle 44, the locking clutch actuator 94, or both, and may be disposed on an opposite side of the second hub portion 114 from the first hub portion 112. For example, the third hub portion 116 may have a first end surface 170 and a second end surface 172. The first end surface 170 may engage the second end surface 162 of the second hub portion 114. The second end surface 172 may be disposed opposite the first end surface 170. The second hub portion 114 may also include a set of holes 174 and a hub mounting flange 176.

Referring to FIGS. 5 and 9, the set of holes 174 may extend from the first end surface 170 toward the second end surface 172. In the configuration shown, the set of holes 174 are configured as blind holes that receive mounting studs 120. The mounting studs 120 may be fixedly positioned with respect to the third hub portion 116. For instance, the set of holes 174 may have threads that may mate with corresponding threads on the mounting studs 120.

Referring to FIGS. 2, 5 and 9, the hub mounting flange 176 may extend away from the axis 50. For instance, the hub mounting flange 176 may extend substantially perpendicular to the axis 50 in one or more configurations. The hub mounting flange 176 may facilitate mounting of a wheel 70 that may support a tire. For example, the hub mounting flange 176 may include a set of mounting lug fastener holes that may each receive a wheel mounting lug 180. As is best shown in FIG. 9, the wheel 70 may have a wheel mounting flange that may have a set of holes that may be aligned with the wheel mounting lugs 180. A lug nut 182 may be threaded onto each wheel mounting lug 180 to secure the wheel 70 to the hub assembly 88.

Referring to FIG. 9, the hub cavity 118 may be disposed inside the hub assembly 88 and may extend between opposing ends of the hub assembly 88. For example, the hub cavity 118 may extend from the hub cap 110 to the seal assembly 86. The hub cavity 118 may receive at least a portion of an axle shaft 24 and may receive at least a portion of various components of the wheel end assembly 26, such as the spindle 44, first wheel bearing 80, the second wheel bearing 82, the preload nut 84, the seal assembly 86, the friction clutch 90, the locking clutch 92, the locking clutch actuator 94, the first biasing member 96, and the second biasing member 98.

Referring to FIGS. 4, 7 and 9, the friction clutch 90 may be adapted to provide friction that may allow the axle shaft 24 and the hub assembly 88 to achieve sufficiently similar rotational velocities about the axis 50 or synchronize the rotational velocities of the axle shaft 24 and the hub assembly 88 about the axis 50. In at least one configuration, the friction clutch 90 may include a disc pack 190, a disc pack hub 192, an actuation plate 194, and a retainer 196.

The disc pack 190 may be axially positioned between the actuation plate 194 and the locking clutch 92. In addition, the disc pack 190 may be radially positioned between the disc pack hub 192 and a portion of the hub assembly 88, such as the first hub portion 112. The disc pack 190 may include one or more inner friction discs 200 and one or more outer friction discs 202.

One or more inner friction discs 200 may be disposed on the disc pack hub 192 and may extend radially away from the axis 50. For example, the inner friction discs 200 may have a hole that may receive the disc pack hub 192. The hole in an inner friction disc 200 may have a toothed profile that may engage and mate with a set of teeth on the disc pack hub 192 such that the inner friction disc 200 is rotatable about the axis 50 with the disc pack hub 192.

One or more outer friction discs 202 may be disposed adjacent to an inner friction disc 200. The outer friction discs 202 may be spaced apart from each other such that an inner friction disc 200 may be disposed between adjacent outer friction discs 202. The outer friction discs 202 may extend from the hub assembly 88 toward the axis 50 and may not rotate about the axis 50 with respect to the hub assembly 88. For example, the outer friction discs 202 may extend from the first hub portion 112 toward the disc pack hub 192. The outer friction discs 202 may have an inside circumferential surface that may face toward and may extend around the axis 50 such that the inner circumferential surface may be spaced apart from the disc pack hub 192. As is best shown in FIGS. 4 and 7, the outer friction discs 202 may have one or more tabs 204 that may extend away from the axis 50 and may extend away from an outer surface or outside circumference of the outer friction disc 202. A tab 204 may be received in a corresponding slot 146 in the first hub portion 112 180. As such, a tab 204 may cooperate with a slot 146 to inhibit rotation of the outer friction discs 202 with respect to the first hub portion 112 while allowing deflection or limited axial movement of the outer friction discs 202.

The disc pack hub 192 may be received inside the disc pack 190. The disc pack hub 192 may be axially positioned between the actuation plate 194 and the locking clutch 92 and may be radially positioned between the axle shaft 24 and the disc pack 190. In at least one configuration, the disc pack hub 192 may include a first side surface 210, a second side surface 212, an inner surface 214, a set of disc pack hub teeth 216, and one or more fastener holes 218.

The first side surface 210 may face toward and may engage the actuation plate 194. The first side surface 210 may be disposed substantially perpendicular to the axis 50 in one or more configurations.

The second side surface 212 may be disposed opposite the first side surface 210. The second side surface 212 may face toward the locking clutch 92 and may be selectively engaged by the locking clutch 92.

The inner surface 214 may extend from the first side surface 210 to the second side surface 212. The inner surface 214 may face toward the axle shaft 24 and may define a hole through which the axle shaft 24 may extend. The inner surface 214 may be spaced apart from the axle shaft 24.

The set of disc pack hub teeth 216 may be disposed opposite the inner surface 214. The disc pack hub teeth 216 may be arranged around the axis 50 and may extend away from the axis 50. In addition, the disc pack hub teeth 216 may extend between the first side surface 210 and the second side surface 212. The disc pack hub teeth 216 may mesh with the toothed profile of the inner friction discs 200 to inhibit rotation of the inner friction discs 200 about the axis 50 with respect to the disc pack hub 192. The disc pack hub teeth 216 may be spaced apart from and may not engage the outer friction discs 202.

One or more fastener holes 218 may be provided with the disc pack hub 192. For instance, one or more fastener holes 218 may extend from the first side surface 210 toward the second side surface 212. Each fastener hole 218 may receive a corresponding fastener 220, such as a bolt, that may couple the disc pack hub 192 to the actuation plate 194. As such, the disc pack hub 192 may not rotate about the axis 50 with respect to the actuation plate 194.

The actuation plate 194 may be disposed adjacent to the disc pack 190 and the disc pack hub 192. The actuation plate 194 may be axially positioned between the first biasing member 96 and the disc pack 190 and may be radially positioned between the axle shaft 24 and the hub assembly 88. In addition, the actuation plate 194 may be rotatable about the axis 50 with the axle shaft 24. In at least one configuration, the actuation plate 194 may include an outboard side surface 230, an inboard side surface 232, and actuation plate spline 234, and one or more fastener holes 236.

The outboard side surface 230 may face toward the hub cap 110 and may engage the first biasing member 96.

The inboard side surface 232 may be disposed opposite the outboard side surface 230. The inboard side surface 232 may face toward the disc pack 190 and may engage the first side surface 210 of the disc pack hub 192. The inboard side surface 232 may selectively engage the disc pack 190 as will be discussed in more detail below.

The actuation plate spline 234 may extend between the outboard side surface 230 and the inboard side surface 232. The actuation plate spline 234 may include a plurality of teeth that may be arranged around the axle shaft 24 and that may extend toward the axle shaft 24. The teeth may be disposed substantially parallel to the axis 50 and may mate with the teeth of the axle spline 64. As such, the actuation plate spline 234 may cooperate with the axle spline 64 to inhibit rotation of the actuation plate 194 about the axis 50 with respect to the axle shaft 24 while allowing the actuation plate 194 to move axially or along the axis 50 with respect to the axle shaft 24.

One or more fastener holes 236 may be provided with the actuation plate 194. For instance, one or more fastener holes 236 may extend from the outboard side surface 230 to the inboard side surface 232. Each fastener hole 236 may be aligned with a corresponding fastener hole 218 on the disc pack hub 192 may receive a corresponding fastener 220.

The retainer 196 may be disposed at an opposite end of the disc pack 190 from the actuation plate 194. As such, the retainer 196 may be axially positioned between the disc pack 190 and the locking clutch 92. The retainer 196 may be fixedly positioned with respect to the hub assembly 88. For example, the retainer 196 may be fixedly mounted in the first hub portion 112 and may extend toward the axis 50. The retainer 196 may have any suitable configuration. For example, the retainer 196 may be configured as an end plate, washer, snap ring, or one or more protrusions that may extend from the hub assembly 88 toward the axis 50. The retainer 196 may act as a stop that may inhibit axial movement of the disc pack 190 toward the locking clutch 92, or to the right from the perspective shown in FIG. 9. In at least one configuration, the retainer 196 may directly engage an end plate of the disc pack 190 or an outer friction disc 202 that is located at an end of the disc pack 190 that is located closest to the locking clutch 92.

Referring to FIGS. 4, 7 and 9, the locking clutch 92 may be rotatable about the axis 50 with a corresponding axle shaft 24. The locking clutch 92 may be configured to selectively engage the hub assembly 88 to mechanically interlock the axle shaft 24 and the hub assembly 88. In addition, the locking clutch 92 may selectively engage the friction clutch 90 to actuate the friction clutch 90 as will be discussed in more detail below. The locking clutch 92 may be axially positioned between the friction clutch 90 and the locking clutch actuator 94. In at least one configuration, the locking clutch 92 may include a locking clutch spline 240, a locking clutch gear 242, an inner pocket 244, an outer pocket 246, and an engagement feature 248.

The locking clutch spline 240 may include a plurality of teeth that may be arranged around the axle shaft 24 and that may extend toward the axle shaft 24. The teeth may be disposed substantially parallel to the axis 50 and may mate with the teeth of the axle spline 64. As such, the locking clutch spline 240 may cooperate with the axle spline 64 to inhibit rotation of the locking clutch 92 about the axis 50 with respect to the axle shaft 24 while allowing the locking clutch 92 to move axially with respect to the axle shaft 24. The locking clutch spline 240 may also be radially positioned between axle shaft 24 and a portion of the locking clutch actuator 94, such as a piston of the locking clutch actuator 94.

The locking clutch gear 242 may be disposed proximate an outside circumference of the locking clutch 92. For example, the locking clutch gear 242 may be configured as a face gear that may include a set of teeth that may extend in an axial direction away from the friction clutch 90 and toward the hub gear 166 of the hub assembly 88. The set of teeth may be arranged around the axis 50 and may extend around and may at least partially define the outer pocket 246. Alternatively, the locking clutch gear 242 may be configured as a spline or set of teeth that may be disposed opposite the locking clutch spline 240 and that may extend away from the axis 50. The set of teeth of the locking clutch gear 242 may selectively engage the teeth of the hub gear 166 as will be discussed in more detail below.

The inner pocket 244 may extend around the axle shaft 24. The inner pocket 244 may be configured as a recess that may extend from an outboard side of the locking clutch 92 in an axial direction that extends away from the friction clutch 90. The inner pocket 244 may receive a portion of the second biasing member 98.

The outer pocket 246 may be disposed on an opposite side of the locking clutch 92 from the inner pocket 244 and may be disposed further from the axis 50 than the inner pocket 244. The outer pocket 246 may extend around at least a portion of the locking clutch spline 240 and may receive a portion of the locking clutch actuator 94 in one or more embodiments.

Referring to FIGS. 4 and 9, the engagement feature 248 may face toward and may selectively engage the friction clutch 90. For example, the engagement feature 248 may face toward and may selectively engage the second side surface 212 of the disc pack hub 192. In the configuration shown, the engagement feature 248 is configured as a ring that may extend around the axis 50 and may protrude an axial direction toward the friction clutch 90.

Referring to FIGS. 4, 7 and 9, the locking clutch actuator 94 may be operable to actuate the locking clutch 92 toward the friction clutch 90 or to the left from the perspective shown in FIG. 9. More specifically, the locking clutch actuator 94 may actuate the locking clutch 92 from a locked position to an unlocked position and to an intermediate position that may be disposed between the locked position and the unlocked position as will be discussed in more detail below. The locking clutch actuator 94 may be fixedly mounted to a portion of the housing assembly 20, such as the spindle 44. In such a configuration, the locking clutch actuator 94 may not rotate about the axis 50 and may be spaced apart from the hub assembly 88. The locking clutch actuator 94 may be of any suitable type. For example, the locking clutch actuator 94 may be a pneumatic, hydraulic, electrical, or electromechanical actuator. In the configuration shown, the locking clutch actuator is depicted as a pneumatic actuator that may include a piston housing 250 and one or more pistons 252.

The piston housing 250 may be received inside the hub assembly 88 and may be fixedly disposed on the housing assembly 20. The piston housing 250 may have an annular configuration and may extend continuously around the axle shaft 24. In addition, the piston housing 250 may define one or more recesses that may receive one or more pistons 252. In at least one configuration, a single recess may be provided that may receive a corresponding piston 252. The single recess may or may not extend continuously around the axis 50. In the configuration shown, the recess is depicted as an annular recess that extends continuously around the axis 50 and is open in a direction that faces toward the locking clutch 92. The piston housing 250 may also include a passage 254, which is best shown in FIG. 9, that may be selectively fluidly connected to a pressurized gas source 256, such as via a conduit like a tube or hose. Pressurized gas may flow from the pressurized gas source 256 through the passage 254 and to the recess and may exert force on a piston 252 to actuate the piston 252 toward the friction clutch 90, or to the left from the perspective shown in FIG. 9. Pressurized gas may be vented from the passage 254 and hence from the recess to allow the piston 252 to move away from the friction clutch 90, or to the right from the perspective shown in FIG. 9.

One or more pistons 252 may be movably disposed on the piston housing 250. More specifically, a piston 252 may be movable in an axial direction with respect to the piston housing 250. In the configuration shown, a single piston 252 is provided that has an annular configuration that may extend continuously around the axis 50; however, it is also contemplated that the piston may also be configured to not extend continuously around the axis 50. The piston 252 may have a first end surface and a second end surface that may be disposed opposite the first end surface. The first end surface may face toward the locking clutch 92. The second end surface may face away from locking clutch 92 and may be received in the recess. One or more seals 258 may be provided with the piston 252, the piston housing 250, or both, to inhibit the leakage of fluid between the piston 252 and the piston housing 250.

A thrust bearing 260 may be provided between the locking clutch 92 and a piston 252. For example, the thrust bearing 260 may be axially positioned between the locking clutch 92 and the first end of the piston 252. The thrust bearing 260 may facilitate rotation of the locking clutch 92 with respect to the piston 252

The first biasing member 96 may bias the actuation plate 194 toward the locking clutch 92. As such, the first biasing member 96 may urge the friction clutch 90 toward an engaged position in which the actuation plate 194 compresses the disc pack 190 to engage the inner friction discs and outer friction discs, such as in an axial direction to the right from the perspective shown in FIG. 9. The first biasing member 96 may be of any suitable type. For example, the first biasing member 96 may be configured as a diaphragm washer, one or more springs, or the like. As is best shown in FIG. 9, the first biasing member 96 may be axially positioned between the hub cap 110 and the actuation plate 194 and may actuate the friction clutch 90 toward the engaged position when sufficient force is not exerted by the locking clutch 92 against the friction clutch 90. The first biasing member 96 may extend axially from the actuation plate 194 to a retainer feature 270, such as a washer, snap ring or combination thereof, that may be received in the first groove 66 of the axle shaft 24.

The second biasing member 98 may bias the locking clutch 92 toward the hub gear 166 of the hub assembly 88. More specifically, the second biasing member 98 may actuate the locking clutch 92 toward the locked position when sufficient force is not exerted by the locking clutch actuator 94. As such, the second biasing member 98 may urge the locking clutch 92 toward a locked position in which the locking clutch gear 242 of the locking clutch 92 meshes with the hub gear 166 of the hub assembly 88, or in an axial direction to the right from the perspective shown in FIG. 9. The second biasing member 98 may be located at an opposite side of the actuation plate 194 from the first biasing member 96 and may be axially positioned between the actuation plate 194 and the locking clutch 92. In addition, the second biasing member 98 may extend from the locking clutch 92 toward the actuation plate 194. The second biasing member 98 may be of any suitable type. For example, the second biasing member 98 may be configured as one or more springs or the like. In at least one configuration, the second biasing member 98 may be configured as a spring that may extend around the axle shaft 24 and may extend from the locking clutch 92 to a retainer feature 272, such as a washer, snap ring or combination thereof, that may be received in the second groove 68 of the axle shaft 24. Accordingly, the second biasing member 98 may be spaced apart from and may not engage the friction clutch 90 and may not exert a biasing force on the friction clutch 90.

Figure 10:
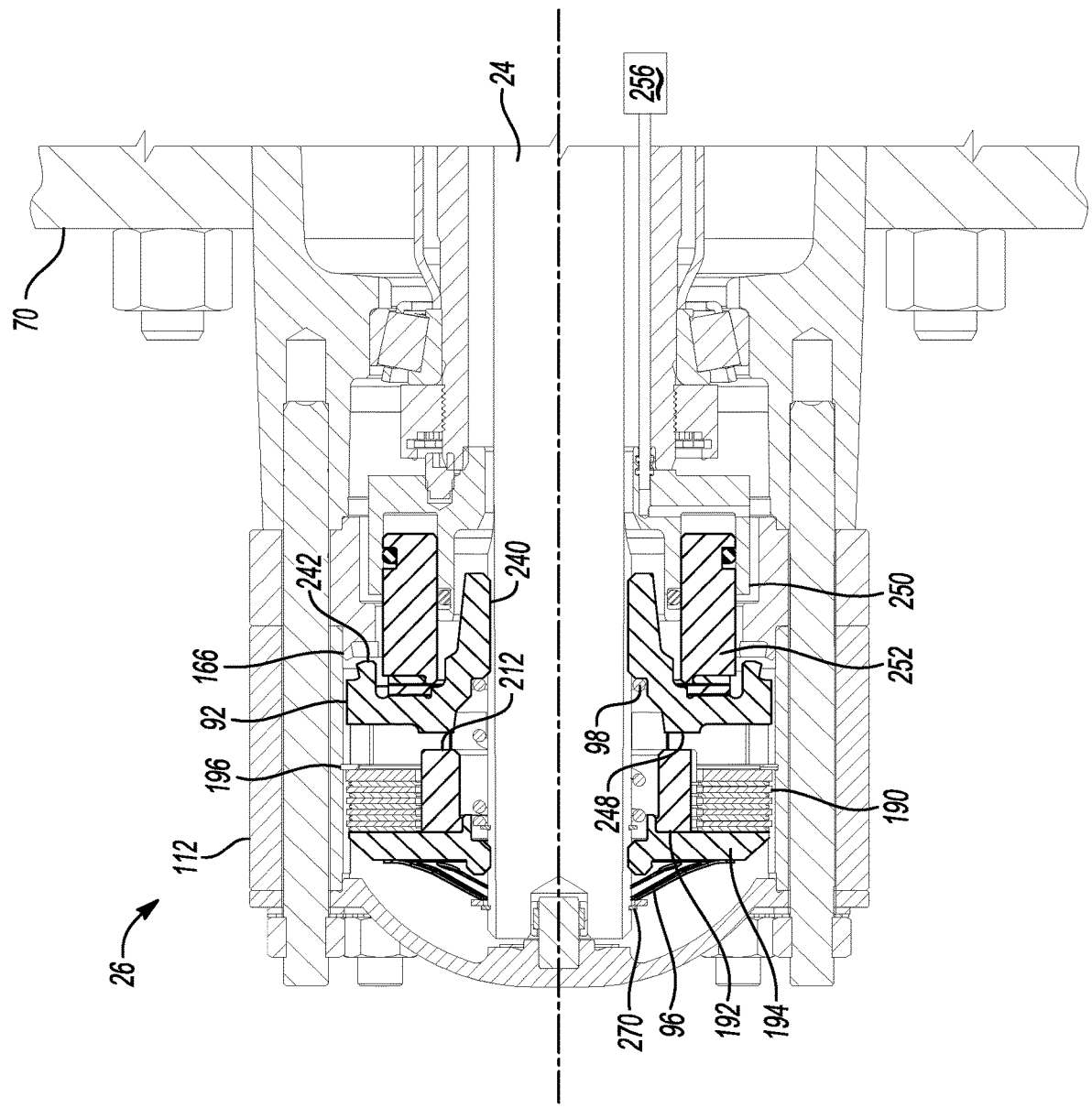
FIG. 10 is a section view showing the locking clutch in an intermediate position and the friction clutch in the engaged position.
Figure 11:
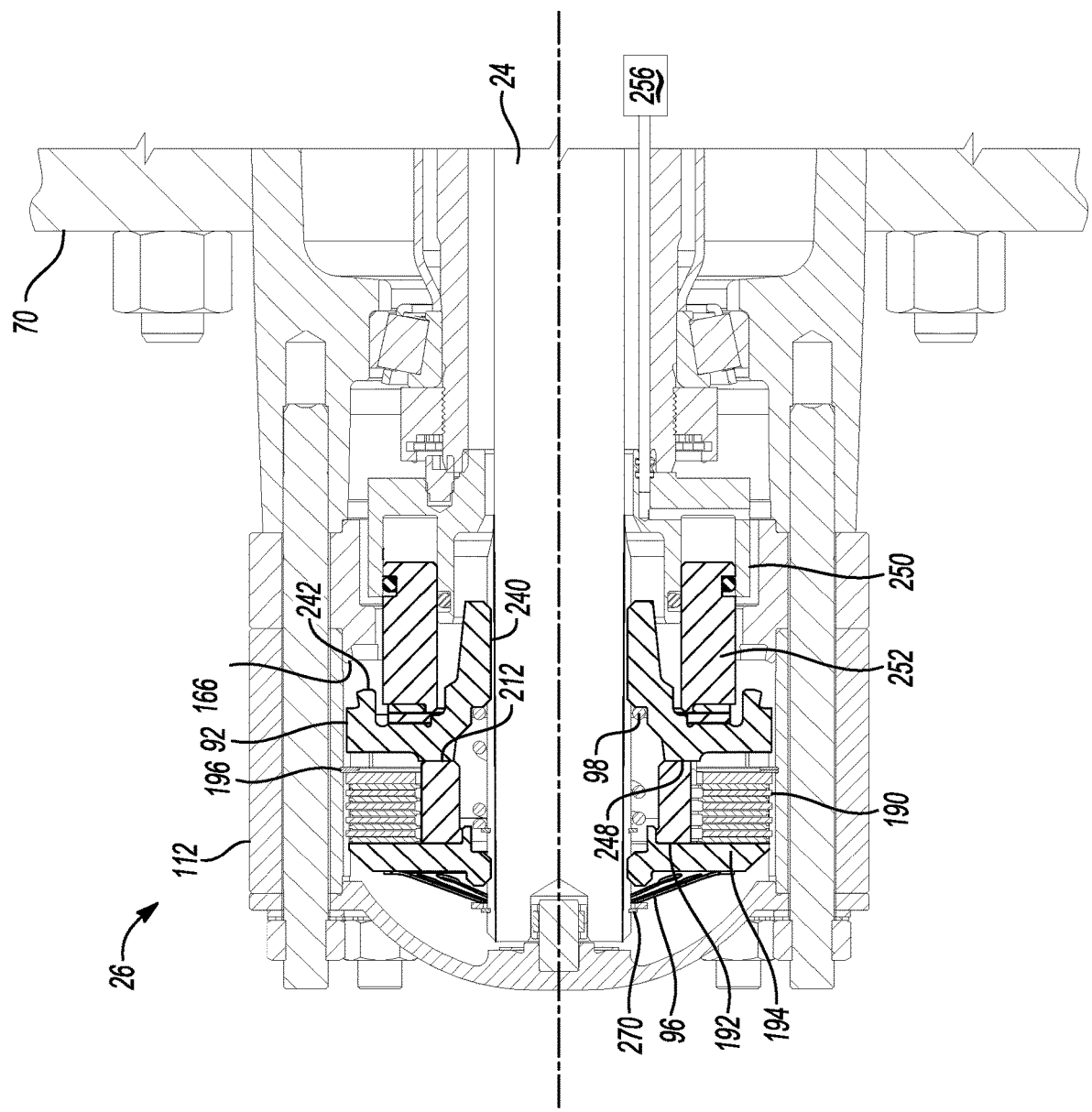
FIG. 11 is a section view showing the locking clutch in an unlocked position and the friction clutch in a disengaged position.

Referring to FIGS. 9-11, a method of control and operation of the wheel end assembly 26 will now be described in more detail. As an overview, the friction clutch 90 and the locking clutch 92 may be operable to disconnect an axle shaft 24 from a corresponding hub assembly 88 such that no torque or negligible torque is transmitted between the axle shaft 24 to the hub assembly 88. In addition, the friction clutch 90 and the locking clutch 92 may cooperate to connect an axle shaft 24 to a corresponding hub assembly 88 so that torque may be transmitted between the axle shaft 24 and the hub assembly 88 or from the axle shaft 24 to the hub assembly 88. More specifically, the friction clutch 90 may be engaged to allow the axle shaft 24 and the hub assembly 88 to rotate together about the axis 50 to obtain the same or substantially similar rotational velocities prior to locking the locking clutch 92 to the hub assembly 88 to more robustly transmit torque between the axle shaft 24 and the hub assembly 88 by way of the locking clutch 92.

The friction clutch 90 may be movable between an engaged position and a disengaged position. The locking clutch 92 may be movable between three positions, which are referred to as a locked position, an intermediate position, and an unlocked position. The intermediate position may be axially positioned between the locked position and the unlocked position.

Referring to FIG. 9, the axle assembly 10 is shown with the friction clutch 90 in an engaged position and the locking clutch 92 in a locked position. Torque may be transmitted between the axle shaft 24 and the hub assembly 88 via the friction clutch 90 when the friction clutch 90 is in the engaged position. In the engaged position, the locking clutch 92 is spaced apart from the friction clutch 90 under the biasing force of the second biasing member 98 and the first biasing member 96 exerts a biasing force on the actuation plate 194 that actuates the actuation plate 194 toward the locking clutch 92 to compress and engage the disc pack 190. Torque may also be transmitted between the axle shaft 24 and the hub assembly 88 via the locking clutch 92 when the locking clutch 92 is in the locked position. In the locked position, the second biasing member 98 exerts a biasing force on the locking clutch 92 that actuates the locking clutch 92 away from the friction clutch 90 so that the locking clutch gear 242 meshes with the hub gear 166 of the hub assembly 88. As such, torque may be transmitted between the axle shaft 24 and the hub assembly 88 by way of the meshed teeth of the locking clutch gear 242 and the hub gear 166. The locking clutch actuator 94 may be disposed in a retracted position in which the locking clutch actuator 94 does not exert sufficient force on the locking clutch 92 to overcome the biasing force of the second biasing member 98, such as when pressurized gas is not provided to the piston housing 250.

Referring to FIG. 10, the axle assembly 10 is shown with the friction clutch 90 in the engaged position and the locking clutch 92 in the intermediate position. In the intermediate position, the locking clutch actuator 94 is actuated toward the friction clutch 90 or to the left from the perspective shown such that (1) the locking clutch gear 242 disengages from the hub gear 166 of the hub assembly 88 and (2) the locking clutch 92 does not actuate the friction clutch 90 from its disengaged position. As such, torque may not be transmitted between the axle shaft 24 and the hub assembly 88 via the locking clutch 92 when the locking clutch 92 is in the intermediate position. For example, a predetermined amount of pressurized fluid may be provided to actuate the piston 252 from its retracted position such that the locking clutch 92 moves from the locked position to the intermediate position without reaching the unlocked position. The locking clutch 92 may or may not engage the friction clutch 90 when the locking clutch 92 is in the intermediate position. Moreover, the friction clutch 90 may not be actuated by the locking clutch 92 in the intermediate position. As such, torque may not be transmitted between the axle shaft 24 and the hub assembly 88 via the friction clutch 90.

Referring to FIG. 11, the axle assembly 10 is shown with the friction clutch 90 in a disengaged position and the locking clutch 92 in the unlocked position. Torque may not be transmitted between the axle shaft 24 and the hub assembly 88 via the friction clutch 90 when the friction clutch 90 is in the disengaged position or insufficient torque may be transmitted between the axle shaft 24 and the hub assembly 88 via the friction clutch 90 to rotate the hub assembly 88 when the friction clutch 90 is in the disengaged position. In the disengaged position, the locking clutch 92 may engage the friction clutch 90 and may overcome the biasing force exerted by the first biasing member 96 and the second biasing member 98 to actuate the disc pack hub 192 and the actuation plate 194 toward the hub cap 110, or to the left from the perspective shown in FIG. 11, to decompress, release, or disengage the discs of the disc pack 190. As such, no torque or insufficient torque may be transmitted between the axle shaft 24 and the hub assembly 88 via the friction clutch 90 when the friction clutch 90 is in the disengaged position. For example, an additional amount of pressurized fluid may be provided to further actuate the piston 252 to move the locking clutch 92 from the intermediate position to the unlocked position, or further to the left from the perspective shown as compared to FIG. 10. As such, the locking clutch 92 may engage or contact the disc pack hub 192 of the friction clutch 90, compress the second biasing member 98, and exert force on the disc pack hub 192 to actuate the friction clutch 90 to the disengaged position. The actuation plate 194 may move away from the retainer 196 to allow the discs of the disc pack 190 to move apart and may compress the first biasing member 96. As such, the hub assembly 88 may be rotatable with respect to the axle shaft 24 when the friction clutch 90 is in the disengaged position and the locking clutch 92 is in the unlocked position.

The axle shaft 24 may be reconnected to the hub assembly 88 by effectively reversing the sequence of steps described above. For instance, pressurized gas may be vented to allow the piston 252 to retract and the locking clutch 92 to return to the intermediate position under the biasing force of the second biasing member 98. Movement of the locking clutch 92 to the intermediate position may reduce or eliminate the force exerted by the locking clutch 92 against the disc pack hub 192. The disc pack hub 192 and actuation plate 194 may then move from the disengaged position to the engaged position to compress and reengage the discs of the disc pack 190 under the biasing force of the first biasing member 96. As a result, torque may be transmitted between the axle shaft 24 and the hub assembly 88 via the friction clutch 90. The locking clutch 92 may be held in the intermediate position before moving to the locked position. For instance, the locking clutch 92 may be held in the intermediate position until the rotational velocity of the hub assembly 88 is sufficiently close to the rotational velocity of the axle shaft 24. The rotational velocity of the hub assembly 88 may be sufficiently close to the rotational velocity of the axle shaft 24 when the rotational velocity of the hub assembly 88 is within a threshold amount from the rotational velocity of the axle shaft 24. The threshold amount may represent a tolerance or velocities at which the locking clutch gear 242 is re-engageable with the hub gear 166 of the hub assembly 88. For instance, the threshold amount may be when the rotational velocities are about 5% or less from each other. Alternatively, a rotational velocity of the hub assembly 88 that is sufficiently close the rotational velocity of the axle shaft 24 may be obtained by holding the locking clutch 92 in the intermediate position for a predetermined period of time. The threshold amount or predetermined period of time may be based on system performance requirements or determined by vehicle development testing. Finally, additional pressurized gas may be vented to allow the piston 252 to return to its retracted position, thereby allowing locking clutch 92 to move from the intermediate position to the locked position under the biasing force of the second biasing member 98. As a result, the axle shaft 24 may be mechanically coupled to the hub assembly 88 via the locking clutch 92 such that torque is transmitted between the axle shaft 24 and the hub assembly.

It is further noted that for a locking clutch actuator 94 having a pneumatic or hydraulic configuration, the friction clutch 90 and locking clutch 92 will move to or remain in the disengaged and locked positions, respectively when a sufficient amount of pressurized fluid cannot be provided to actuate the piston, such as in the event of a leak, performance issue with the pressurized gas source 256, or a supply valve that cannot be actuated from a closed position. As such, the wheel end assembly will default to a connected state in which an axle shaft 24 is operatively connected to a hub assembly 88 to facilitate the transmission of torque therebetween.

Figure 12:
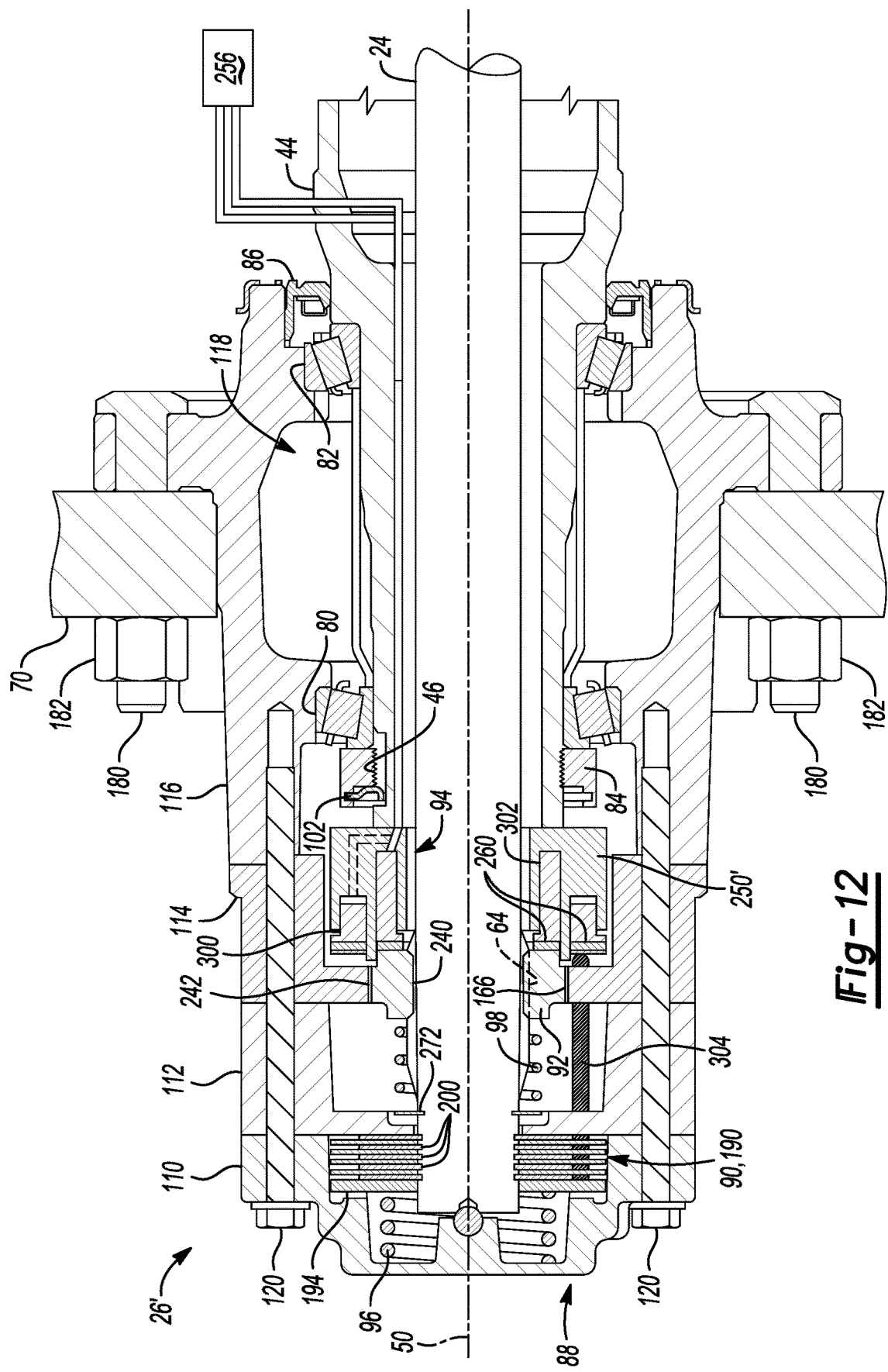
FIG. 12 is a section view of another configuration of a wheel end disconnect showing a locking clutch in a locked position and a friction clutch in an engaged position.
Figure 13:
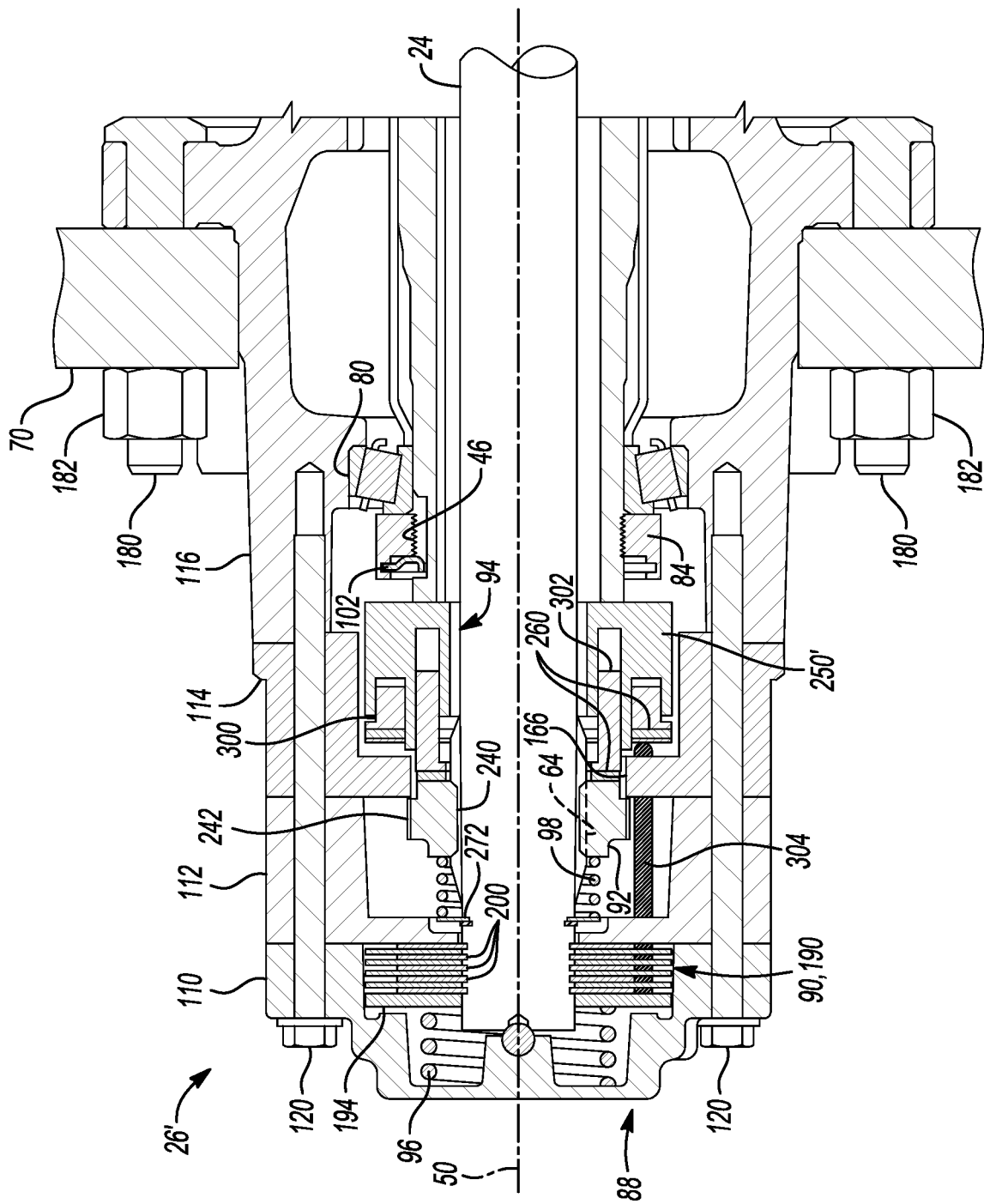
FIG. 13 is a section view of the wheel end disconnect of FIG. 12 showing the locking clutch in an unlocked position and the friction clutch in the engaged position.
Figure 14:
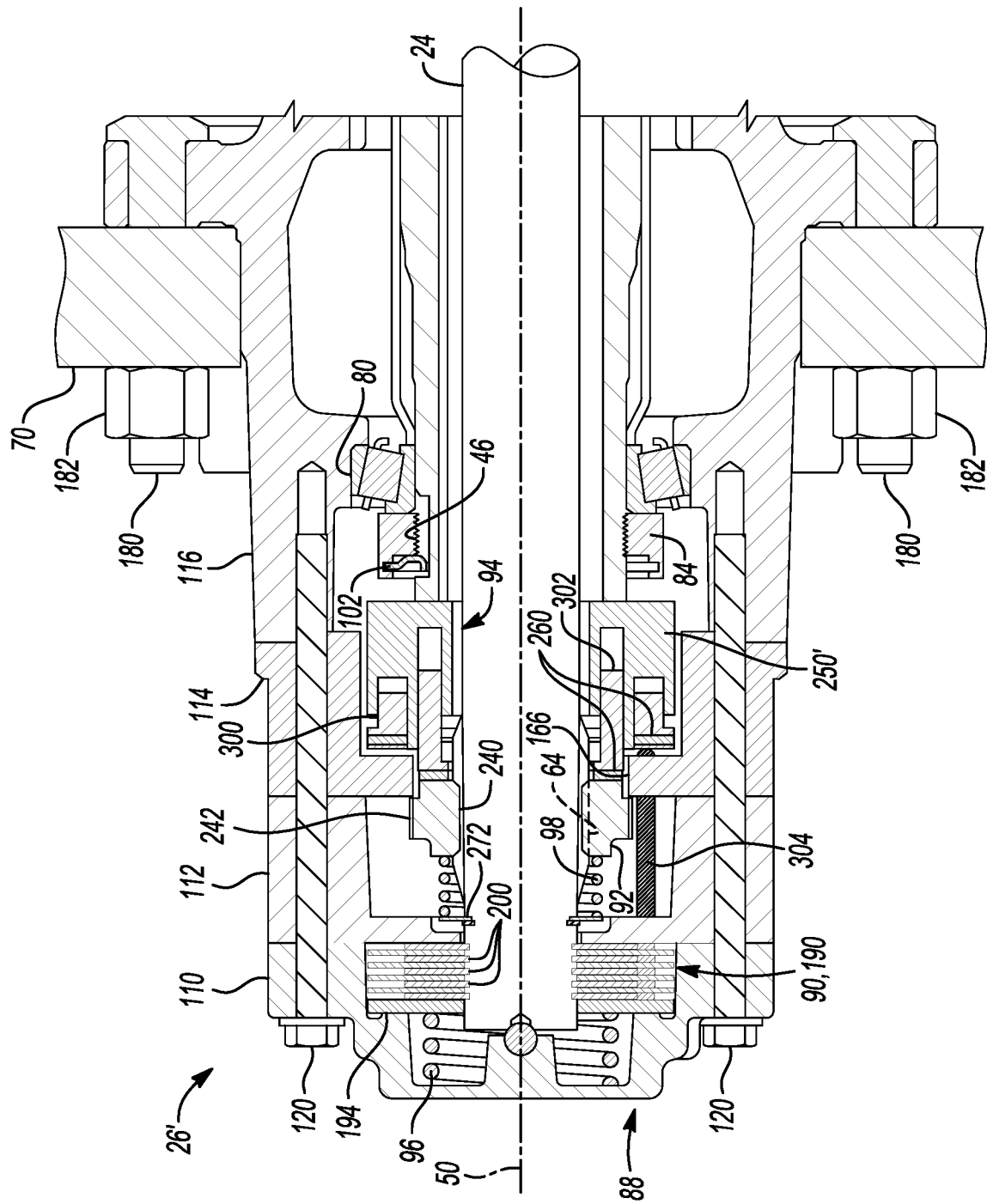
FIG. 14 is a section view of the wheel end disconnect of FIG. 12 showing the locking clutch in an unlocked position and the friction clutch in a disengaged position.

Referring to FIGS. 12-14, another configuration of a wheel end assembly 26' is shown. This configuration is similar to the configuration previously discussed, but includes two pistons that can be independently actuated to independently move a friction clutch and a locking clutch. As such, the friction clutch and the locking clutch may be spaced apart from each other at all actuation positions and the locking clutch may move between unlocked and locked positions without pausing at an intermediate position.

Referring to FIG. 12, the axle assembly 10 is shown with the friction clutch 90 in an engaged position and the locking clutch 92 in a locked position. Torque may be transmitted between the axle shaft 24 and the hub assembly 88 via the friction clutch 90 when the friction clutch 90 is in the engaged position. In the engaged position, the locking clutch 92 may be biased away from the friction clutch 90 under the biasing force of the second biasing member 98, and the first biasing member 96 may exert a biasing force on the actuation plate 194 that actuates the actuation plate 194 toward the locking clutch 92 to compress and engage the disc pack 190. In the configuration shown, the inner friction discs 200 of the friction clutch 90 may be coupled to the axle shaft 24, such as with mating splines, and the disc pack hub may be eliminated. In addition, the first biasing member 96 is depicted as a coil spring that extends from the actuation plate 194 to the hub cap 110. Torque may also be transmitted between the axle shaft 24 and the hub assembly 88 via the locking clutch 92 when the locking clutch 92 is in the locked position. In the locked position, the second biasing member 98 exerts a biasing force on the locking clutch 92 that actuates the locking clutch 92 away from the friction clutch 90 so that the locking clutch gear 242 meshes with the hub gear 166 of the hub assembly 88. As such, torque may be transmitted between the axle shaft 24 and the hub assembly 88 by way of the meshed teeth of the locking clutch gear 242 and the hub gear 166. The locking clutch actuator 94 may be disposed in a retracted position in which the locking clutch actuator 94 does not exert sufficient force on the locking clutch 92 to overcome the biasing force of the second biasing member 98, such as when pressurized gas is not provided to the piston housing 250.

The locking clutch actuator 94 may include a piston housing 250' that may include separate recesses that may receive an outer piston 300 and an inner piston 302. The recesses may not be fluidly connected, which may allow the inner piston 302 to be actuated independently of the outer piston 300. Each recess may be selectively fluidly connected to the pressurized gas source 256 via separate passages in the piston housing 250', separate conduits that extend from the piston housing 250', or both. The outer piston 300 may be disposed further from the axis 50 than the inner piston 302. In addition, the outer piston 300 may extend continuously around the inner piston 302. The outer piston 300 may be configured to actuate the friction clutch 90 via one or more rods 304 that may extend between the outer piston 300 and the friction clutch 90. The rod 304 may be positioned further away from the axis 50 than the locking clutch 92 and may extend through openings in the inner friction discs 200 and the outer friction discs 202 of the disc pack 190 and extend to the actuation plate 194. A thrust bearing 260 may be provided between the outer piston 300 and an end of the rod 304 to facilitate rotational movement of the rod 304 with respect to the outer piston 300.

Referring to FIG. 13, the axle assembly 10 is shown with the friction clutch 90 in the engaged position and the locking clutch 92 in the unlocked position. In the unlocked position, the inner piston 302 is actuated toward the friction clutch 90 or to the left from the perspective shown such that the locking clutch gear 242 disengages from the hub gear 166 of the hub assembly 88. As such, torque may not be transmitted between the axle shaft 24 and the hub assembly 88 via the locking clutch 92 when the locking clutch 92 is in the unlocked position. For example, pressurized fluid may be provided to actuate the inner piston 302 from its retracted position such that the locking clutch 92 moves from the locked position to the unlocked position.

Referring to FIG. 14, the axle assembly 10 is shown with the friction clutch 90 in a disengaged position and the locking clutch 92 in the unlocked position. Torque may not be transmitted between the axle shaft 24 and the hub assembly 88 via the friction clutch 90 when the friction clutch 90 is in the disengaged position or insufficient torque may be transmitted from the axle shaft 24 to the hub assembly 88 via the friction clutch 90 to rotate the hub assembly 88 when the friction clutch 90 is in the disengaged position. In the disengaged position, the outer piston 300 may exert force against a first end of the rod 304, which may actuate the rod 304 toward the hub cap 110. Force may be transmitted from the rod 304 to the actuation plate 194 and may overcome the biasing force exerted by the first biasing member 96 to actuate the actuation plate 194 toward the hub cap 110, or to the left from the perspective shown in FIG. 14, to decompress, release, or disengage the discs of the disc pack 190. As such, no torque or insufficient torque may be transmitted between the axle shaft 24 and the hub assembly 88 via the friction clutch 90 when the friction clutch 90 is in the disengaged position. Movement of the actuation plate 194 to the left from the configuration shown may allow the discs of the disc pack 190 to move apart and may compress the first biasing member 96. As such, the hub assembly 88 may be rotatable with respect to the axle shaft 24 when the friction clutch 90 is in the disengaged position and the locking clutch 92 is in the unlocked position.

The axle shaft 24 may be reconnected to the hub assembly 88 by effectively reversing the sequence of steps described above. For instance, pressurized gas may be vented to allow the outer piston 300 to retract. The actuation plate 194 and the rod 304 may move from their previous positions to the right from the perspective shown to compress and reengage the discs of the disc pack 190 under the biasing force of the first biasing member 96. As a result, torque may be transmitted between the axle shaft 24 and the hub assembly 88 via the friction clutch 90. The locking clutch 92 may be held in the unlocked position until the rotational velocity of the hub assembly 88 is sufficiently close to the rotational velocity of the axle shaft 24 as previously discussed. Finally, pressurized gas may be vented to allow the inner piston 302 to return to its retracted position, thereby allowing locking clutch 92 to move from the unlocked position to the locked position under the biasing force of the second biasing member 98. As a result, the axle shaft 24 may be mechanically coupled to the hub assembly 88 via the locking clutch 92 such that torque is transmitted between the axle shaft 24 and the hub assembly.

The axle assemblies and methods of control described above may be provided with an axle system that has drive axles that may be connected in series, such as a tandem axle arrangement. Efficiency of the axle system may be improved by not providing torque to the wheels of at least one drive axle when torque demands are sufficiently low, such as when the vehicle is at a road cruise speed, such as cruising at highway speeds. As such, the wheel end disconnect described above may allow such efficiency gains to be realized. In addition, the method of control may allow the wheel end disconnect to be reengaged by engaging the friction clutch prior to engaging the locking clutch to reduce the rotational velocity differences between the axle shaft and the hub assembly so that the locking clutch may be reengaged without mechanical clashing or misalignment between the base gears or with reduced mechanical clashing, thereby reducing noise and improving durability and operational performance.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a hub assembly that is rotatable about an axis;
   an axle shaft that is received in the hub assembly and is rotatable about the axis;
   a friction clutch that is received in the hub assembly and is moveable between an engaged position in which torque is transmitted between the axle shaft and the hub assembly via the friction clutch and a disengaged position, the friction clutch having an actuation plate;
   a locking clutch that is received in the hub assembly and that is rotatable about the axis with the axle shaft, wherein the locking clutch is moveable between a locked position in which the locking clutch transmits torque to the hub assembly and an unlocked position in which the locking clutch does not transmit torque to rotate the hub assembly;
   a first biasing member that biases the actuation plate toward the locking clutch to urge the friction clutch toward the engaged position; and
   a second biasing member that biases the locking clutch toward the locked position, wherein the second biasing member is disposed on an opposite side of the actuation plate from the first biasing member and the second biasing member extends from the locking clutch toward the actuation plate.

2. The axle assembly of claim 1 wherein the hub assembly is rotatable with respect to the axle shaft when the friction clutch is in the disengaged position and the locking clutch is in the unlocked position.

3. The axle assembly of claim 1 wherein the friction clutch includes a disc pack and wherein the actuation plate is rotatable about the axis with the axle shaft and is moveable in an axial direction with respect to the axle shaft to actuate the disc pack.

4. The axle assembly of claim 1 further comprising a locking clutch actuator that is operable to actuate the locking clutch toward the friction clutch, wherein the locking clutch actuator includes a piston housing that is disposed inside the hub assembly and that receives one or more pistons.

5. The axle assembly of claim 1 wherein the second biasing member extends from the locking clutch to a retainer feature that is received in a second groove of the axle shaft.

6. The axle assembly of claim 1 wherein the locking clutch is spaced apart from the friction clutch when the locking clutch is in the locked position and the locking clutch engages the friction clutch when the locking clutch is in the unlocked position.

7. An axle assembly comprising:
   a hub assembly that is rotatable about an axis;
   an axle shaft that is received in the hub assembly and is rotatable about the axis;
   a friction clutch configured to transmit torque between the axle shaft and the hub assembly, wherein the friction clutch is moveable between an engaged position and a disengaged position; and
   a locking clutch configured to transmit torque between the axle shaft and the hub assembly, wherein the locking clutch is moveable between a locked position and an unlocked position in which the locking clutch does not transmit torque to rotate the hub assembly, and the locking clutch actuates the friction clutch to the disengaged position when the locking clutch moves to the unlocked position.

8. The axle assembly of claim 7 wherein the locking clutch is spaced apart from the friction clutch when the locking clutch is in the locked position and the locking clutch engages the friction clutch when the locking clutch is in the unlocked position.

9. The axle assembly of claim 7 wherein the locking clutch is moveable to an intermediate position that is axially positioned between the locked position and the unlocked position, wherein the locking clutch actuates the friction clutch to the disengaged position when the locking clutch moves from the intermediate position to the unlocked position.

10. The axle assembly of claim 9 wherein the locking clutch does not transmit torque to the hub assembly and the friction clutch transmits torque to the hub assembly when the locking clutch is in the intermediate position.

11. The axle assembly of claim 9 further comprising a locking clutch actuator that is operable to actuate the locking clutch from the locked position to the intermediate position and to the unlocked position.

12. The axle assembly of claim 11 wherein the locking clutch actuator actuates the locking clutch toward the friction clutch.

13. The axle assembly of claim 12 wherein the axle assembly includes a housing assembly, a piston housing that is disposed in the hub assembly and is fixedly disposed on the housing assembly, and a piston that is moveably disposed in the piston housing that actuates the locking clutch.

14. The axle assembly of claim 13 wherein the locking clutch is partially received between the piston and the axle shaft.

15. The axle assembly of claim 13 further comprising a thrust bearing that is axially positioned between the locking clutch and the piston that facilitates rotation of the locking clutch with respect to the piston.

16. A method of controlling an axle assembly comprising:
    disconnecting an axle shaft from a hub assembly that is adapted to support a wheel by:
        actuating a locking clutch from a locked position in which the locking clutch transmits torque to the hub assembly to an intermediate position in which the locking clutch does not transmit torque between the axle shaft and the hub assembly; and
        actuating the locking clutch from the intermediate position to an unlocked position in which the locking clutch actuates a friction clutch from an engaged position in which torque is transmitted between the axle shaft and the hub assembly via the friction clutch and a disengaged position in which torque is not transmitted between the axle shaft and the hub assembly via the friction clutch.

17. The method of claim 16 further comprising connecting the axle shaft to the hub assembly by:
    actuating the friction clutch from the disengaged position to the engaged position by actuating the locking clutch from the unlocked position to the intermediate position, thereby allowing torque to be transmitted between the axle shaft and the hub assembly; and
    actuating the locking clutch from the intermediate position to the locked position to mechanically couple the axle shaft to the hub assembly with the locking clutch such that torque is transmitted between the axle shaft and the hub assembly via the locking clutch.

18. The method of claim 17 wherein a first biasing member biases the friction clutch from the disengaged position to the engaged position and a second biasing member biases the locking clutch from the unlocked position to the intermediate position and from the intermediate position to the locked position.

19. The method of claim 17 wherein the locking clutch is held in the intermediate position before moving to the locked position.

20. The method of claim 19 wherein the locking clutch is held in the intermediate position until a rotational velocity of the hub assembly is within a threshold amount from a rotational velocity of the axle shaft.

\* \* \* \* \*